(12) United States Patent
Yim

(10) Patent No.: US 12,388,966 B2
(45) Date of Patent: Aug. 12, 2025

(54) DISPLAY DEVICE WITH ADJUSTABLE STEREOPSIS DEPTH AND DRIVING METHOD THEREOF

(71) Applicant: SAMSUNG DISPLAY CO., LTD., Yongin-si (KR)

(72) Inventor: Dale Yim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 28 days.

(21) Appl. No.: 18/416,733

(22) Filed: Jan. 18, 2024

(65) Prior Publication Data

US 2024/0323334 A1 Sep. 26, 2024

(30) Foreign Application Priority Data

Mar. 24, 2023 (KR) .......................... 10-2023-0038598

(51) Int. Cl.
*H04N 13/128* (2018.01)
(52) U.S. Cl.
CPC ................................. *H04N 13/128* (2018.05)
(58) Field of Classification Search
CPC .. H04N 13/128; H04N 13/371; H04N 13/332; G09G 3/003; G09G 2310/08
USPC ............................................................ 348/51
See application file for complete search history.

(56) References Cited

FOREIGN PATENT DOCUMENTS

KR 10-2013-0082367 A 7/2013

*Primary Examiner* — Tung T Vo
(74) *Attorney, Agent, or Firm* — F. Chau & Associates, LLC

(57) ABSTRACT

A display device includes: a processor for generating first input image data, a first input data enable signal, second input image data, and a second input data enable signal; a first stereopsis depth adjuster for generating first output image data and a first output data enable signal, based on the first input image data and the first input data enable signal; a first sub-display device for displaying a first object, based on the first output image data and the first output data enable signal; a second stereopsis depth adjuster for generating second output image data and a second output data enable signal, based on the second input image data and the second input data enable signal; and a second sub-display device for displaying a second object, based on the second output image data and the second output data enable signal. The first stereopsis depth adjuster shifts the first output data enable signal relative to the first input data enable signal, or the second stereopsis depth adjuster shifts the second output data enable signal relative to the second input data enable signal, and a position of the first object or the second object is adjusted.

20 Claims, 15 Drawing Sheets

DISPLAY DEVICE WITH ADJUSTABLE STEREOPSIS DEPTH AND DRIVING METHOD THEREOF

CROSS-REFERENCE TO RELATED APPLICATION

The present application claims priority under 35 U.S.C. § 119(a) to Korean patent application No. 10-2023-0038598 filed on Mar. 24, 2023, in the Korean Intellectual Property Office, the entire disclosure of which is incorporated by reference herein.

FIELD

The present disclosure generally relates to display technology, and more particularly relates to a display device with adjustable stereopsis depth and a driving method thereof.

DISCUSSION

With the ongoing development of information technologies, the roles of display devices, which provide connection mediums between users and information, continue to expand. Accordingly, display devices, such as liquid crystal display devices and/or organic light-emitting display devices, are increasingly used.

To meet users' demands, various kinds of display devices have been released. Augmented Reality (AR) glasses may include a display panel for a left eye and a display panel for a right eye. The AR glasses may display a real background at a portion thereof and display an image object at another portion thereof, thereby implementing augmented reality as if the image object exists in reality. In another example, the AR glasses may have a portion operated as a transparent display, and display an image object at another portion thereof, thereby implementing augmented reality as if the image object exists in reality.

The AR glasses may use binocular disparity of a left eye image and a right eye image, thereby expressing a stereopsis depth of an image object. However, the stereopsis depth of the image object is generally predetermined.

SUMMARY

Embodiments of the present disclosure may provide a display device and a driving method thereof for adjusting a stereopsis depth of an image object according to a user's interpupillary distance, depth perception, or interactive choice.

In accordance with an embodiment of the present disclosure, there is provided a display device including: a processor configured to generate first input image data, a first input data enable signal, second input image data, and a second input data enable signal; a first stereopsis depth adjuster configured to generate first output image data and a first output data enable signal, based on the first input image data and the first input data enable signal; a first sub-display device configured to display a first object, based on the first output image data and the first output data enable signal; a second stereopsis depth adjuster configured to generate second output image data and a second output data enable signal, based on the second input image data and the second input data enable signal; and a second sub-display device configured to display a second object, based on the second output image data and the second output data enable signal, wherein at least one of the first stereopsis depth adjuster is configured to shift the first output data enable signal relative to the first input data enable signal, or the second stereopsis depth adjuster is configured to shift the second output data enable signal relative to the second input data enable signal, and at least one position of the first object or the second object is adjusted.

At least one of the shifts of the first or second output data enable signal may be delayed relative to the first or second input data enable signal, respectively. At least one size of the first object or the second object may be increased when the position of the first object relative to the second object is increased, or at least one size of the first object or the second object may be decreased when the position of the first object relative to the second object is decreased.

In accordance with an embodiment of the present disclosure, there is provided a display device including: a processor configured to generate first input image data, a first input data enable signal, second input image data, and a second input data enable signal; a first stereopsis depth adjuster configured to generate first output image data and a first output data enable signal, based on the first input image data and the first input data enable signal; a first sub-display device configured to display a first object, based on the first output image data and the first output data enable signal; a second stereopsis depth adjuster configured to generate second output image data and a second output data enable signal, based on the second input image data and the second input data enable signal; and a second sub-display device configured to display a second object, based on the second output image data and the second output data enable signal, wherein the first stereopsis depth adjuster sets the first output data enable signal to be delayed from the first input data enable signal, or the second stereopsis depth adjuster sets the second output data enable signal to be delayed from the second input data enable signal, so that positions of the first object and the second object are adjusted.

The second stereopsis depth adjuster may set the second output data enable signal to be delayed from the second input data enable signal. The second stereopsis depth adjuster may set the second output image data to be substantially equal to the second input image data.

The second stereopsis depth adjuster may set the second output data enable signal to be delayed from the second input data enable signal. The second stereopsis depth adjuster may set a portion of the second output image data to be substantially equal to a portion of the second input image data, and adds null data subsequent to the portion of the second output image data.

The first stereopsis depth adjuster may set a phase of the first output data enable signal to be substantially equal to a phase of the first input data enable signal.

The first stereopsis depth adjuster may set the first output image data to be delayed from the first input image data.

The first stereopsis depth adjuster may set a portion of the first output image data to be substantially equal to a portion of the first input image data, and add null data prior to the portion of the first output image data.

The first stereopsis depth adjuster may set the first output data enable signal to be delayed from the first input data enable signal. The first stereopsis depth adjuster may set the first output image data to be substantially equal to the first input image data.

The first stereopsis depth adjuster may set the first output data enable signal to be delayed from the first input data enable signal. The first stereopsis depth adjuster may set a portion of the first output image data to be substantially equal to a portion of the first input image data, and add null data subsequent to the portion of the first output image data.

The second stereopsis depth adjuster may set a phase of the second output data enable signal to be substantially equal to a phase of the second input data enable signal.

The second stereopsis depth adjuster may set the second output image data to be delayed from the second input image data.

The second stereopsis depth adjuster may set a portion of the second output image data to be substantially equal to a portion of the second input image data, and add null data prior to the portion of the second output image data.

The display device may further include a stereopsis depth calculator configured to calculate a stereopsis depth of an object, based on the first input image data and the second input image data.

When the stereopsis depth is different from a predetermined reference stereopsis depth, the first stereopsis depth adjuster may set the first output data enable signal to be delayed from the first input data enable signal.

A first time for which the first stereopsis depth adjuster sets the first output data enable signal to be delayed from the first input data enable signal and a second time for which the second stereopsis depth adjuster sets the second output data enable signal to be delayed from the second input data enable signal may be substantially equal to each other.

In accordance with an embodiment of the present disclosure, there is provided a method of driving a display device, the method including: generating first input image data, a first input data enable signal, second input image data, and a second input data enable signal; generating first output image data and a first output data enable signal, based on the first input image data and the first input data enable signal; displaying a first object, based on the first output image data and the first output data enable signal; generating second output image data and a second output data enable signal, based on the second input image data and the second input data enable signal; and displaying a second object, based on the second output image data and the second output data enable signal, wherein at least one of the first output data enable signal is shifted relative to the first input data enable signal, or the second output data enable signal is shifted relative to the second input data enable signal, and at least one position of the first object or the second object is adjusted.

At least one of the shifts of the first or second output data enable signal may be delayed relative to the first or second input data enable signal, respectively. At least one size of the first object or the second object may be increased when the position of the first object relative to the second object is increased, or at least one size of the first object or the second object may be decreased when the position of the first object relative to the second object is decreased.

In accordance with an embodiment of the present disclosure, there is provided a method of driving a display device, the method including: generating first input image data, a first input data enable signal, second input image data, and a second input data enable signal; generating first output image data and a first output data enable signal, based on the first input image data and the first input data enable signal; displaying a first object, based on the first output image data and the first output data enable signal; generating second output image data and a second output data enable signal, based on the second input image data and the second input data enable signal; and displaying a second object, based on the second output image data and the second output data enable signal, wherein the first output data enable signal is set to be delayed from the first input data enable signal, or the second output data enable signal is set to be delayed from the second input data enable signal, so that positions of the first object and the second object are adjusted.

The second output data enable signal may be set to be delayed from the second input data enable signal. The second output image data may be set to be substantially equal to the second input image data.

The second output data enable signal may be set to be delayed from the second input data enable signal. A portion of the second output image data may be set to be substantially equal to a portion of the second input image data, and null data may be added subsequent of the portion to the second output image data.

A phase of the first output data enable signal may be set to be substantially equal to a phase of the first input data enable signal.

The first output image data may be set to be delayed from the first input image data.

A portion of the first output image data may be set to be substantially equal to a portion of the first input image data, and null data may be added prior to the portion of the first output image data.

BRIEF DESCRIPTION OF THE DRAWINGS

The inventive concept is described more fully hereinafter by way of example with reference to the accompanying drawings.

DETAILED DESCRIPTION

Figure 1:
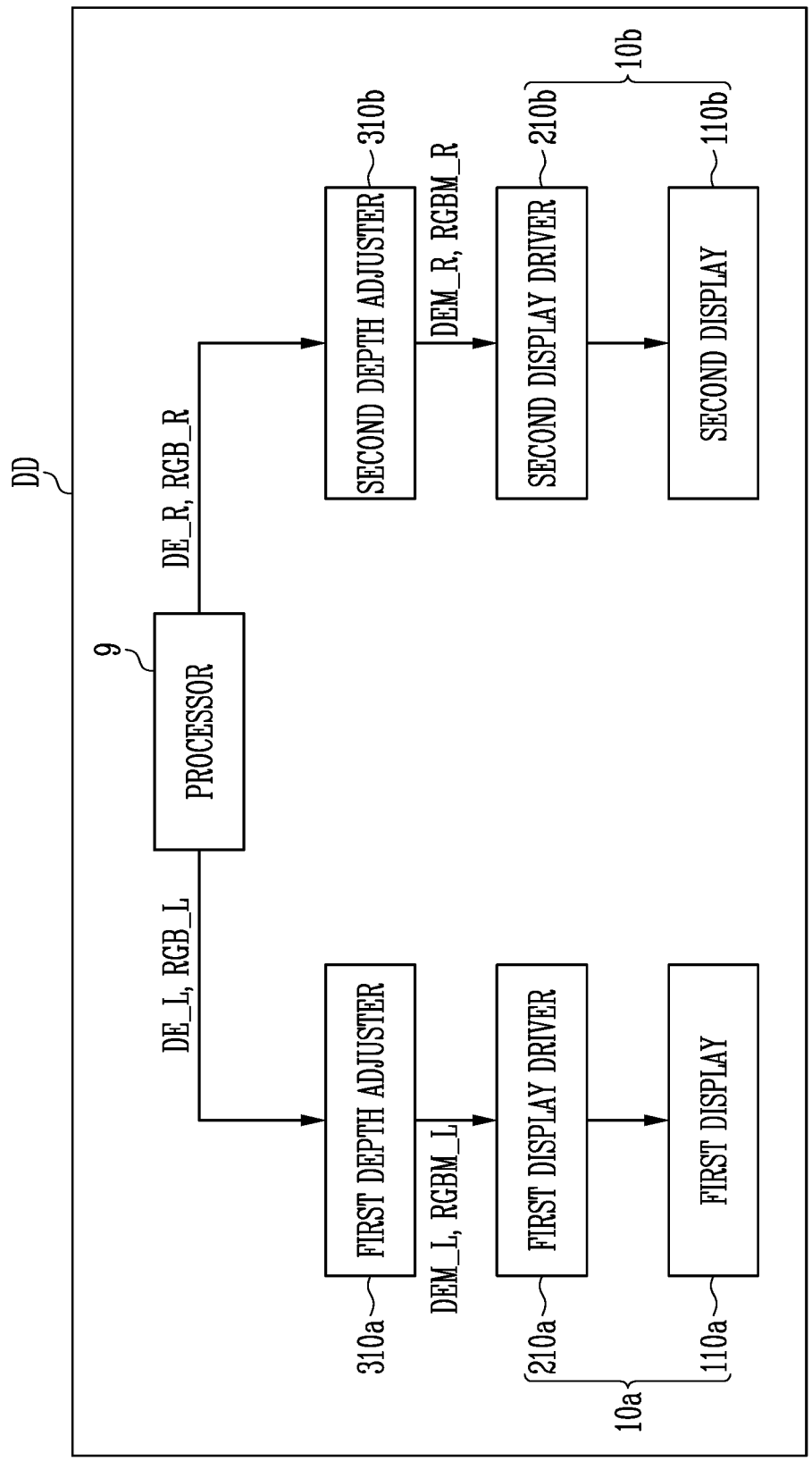
FIG. 1 is a block diagram illustrating a display device in accordance with an embodiment of the present disclosure.

Hereinafter, the inventive concept is described by way of example with reference to non-limiting embodiments thereof. Such embodiments are described in detail with reference to the accompanying drawings so that those skilled in the art may readily practice the invention. It shall be understood that embodiments of the present disclosure may be implemented in various different forms and are not limited to the embodiments described herein. Rather, these embodiments are provided so that this disclosure may be thorough and complete, and fully convey the scope of the inventive concept to those skilled in the art.

In the drawing figures, dimensions may be exaggerated for clarity of illustration. It shall be understood that when an element is referred to as being "between" two elements, it may be the only element between the two elements, or one or more intervening elements may also be present. Like reference numerals may be used to refer to like elements throughout, and substantially duplicate description may be omitted.

A part irrelevant to any portion of this description may be omitted to efficiently describe embodiments of the present disclosure, and the same or similar constituent elements may be designated by the same or similar reference numerals throughout the specification. Therefore, the same or similar reference numerals may be used in different drawings to identify the same or similar elements.

In addition, the size and/or thickness of each component illustrated in the drawings may be arbitrarily shown for optimized understanding and ease of description, but the present disclosure is not limited thereto. Thicknesses of several portions and regions may be exaggerated for clarity of expression.

In the description, the expression "equal" may mean "substantially equal". Moreover, "substantially equal" may mean equality to a degree to which those skilled in the art may understand the equality as not meaningfully different. Other expressions may be expressions in which "substantially" is omitted.

FIG. 1 illustrates a display device in accordance with an embodiment of the present disclosure.

Referring to FIG. 1, the display device DD, in accordance with an embodiment of the present disclosure, may include a processor 9, a first stereopsis depth adjuster 310a, a first sub-display device 10a, a second stereopsis depth adjuster 310b, and a second sub-display device 10b.

The processor 9 may be an application processor (AP), a central processing unit (CPU), a graphics processing unit (GPU), or the like. The processor 9 may generate first input image data RGB_L, a first input data enable signal DE_L, second input image data RGB_R, and a second input data enable signal DE_R.

The first input image data RGB_L of a first object may include a first color grayscale, a second color grayscale, and a third color grayscale. The first color grayscale may be a grayscale for expressing a first color, the second grayscale may be a grayscale for expressing a second color, and the third grayscale may be a grayscale for expressing a third color. The first color, the second color, and the third color may be different colors.

For example, in a red-green-blue (RGB) color space, the first color may be one color selected from among red, green, and blue, the second color may be one color except the first color selected from among the red, green, and blue, and the third color may be the other color except the first color and the second color selected from among the red, green, and blue. In addition, in a cyan-magenta-yellow (CMY) color space, magenta, cyan, and yellow may be used as the first to third colors instead of red, green, and blue. Moreover, other color spaces are possible, such as but not limited to YUV, YIQ, YCbCr, or CIE Lab space.

The first input image data RGB_L need not include any color grayscales with respect to the other image portion except the first object. The first input image data RGB_1 may include a null value or a value (e.g., 0) which is pre-defined to mean "being empty" with respect to the other image portion except the first object.

The second input image data RGB_R of a second object may include a first color grayscale, a second color grayscale, and a third color grayscale. The second input image data RGB_R may include a null value or a value (e.g., 0) which means pre-defined "being empty" with respect to the other image portion except the second object.

The first input data enable signal DE_L may have an enable level in specific horizontal periods, and have a disable level in other periods. The first input data enable signal DE_L having the enable level may indicate that valid first input image data RGB_L is supplied in the corresponding horizontal periods. The first input data enable signal DE_L having the disable level may indicate that the first input image data RGB_L is not supplied in the corresponding horizontal periods and/or that invalid first input image data RGB_L is supplied in the corresponding horizontal periods.

The second input data enable signal DE_R may have an enable level in specific horizontal periods, and have a disable level in other periods. The second input data enable signal DE_R having the enable level may indicate that valid first input image data RGB_L is supplied in the corresponding horizontal periods. The second input data enable signal DE_R having the disable level may indicate that the second input image data RGB_R is not supplied in the corresponding horizontal periods and/or that invalid second input image data RGB_R is supplied in the corresponding horizontal periods.

In addition, the processor 9 may provide other control signals. These control signals may include a horizontal synchronization signal (Hsync) and a vertical synchronization signal (Vsync). The vertical synchronization signal may include a plurality of pulses, and indicate that a previous frame period is ended and a current frame period is started with respect to a time at which each of the pulses is generated. An interval between adjacent pulses of the vertical synchronization signal may correspond to one frame period. The horizontal synchronization signal may include a plurality of pulses, and indicate that a previous horizontal period is ended and a new horizontal period is started with respect to a time at which each of the pulses is generated. An interval between adjacent pulses of the horizontal synchronization signal may correspond to one horizontal period. Each frame period may include substantially the same number of horizontal periods.

The first stereopsis depth adjuster 310a may generate first output image data RGBM_L and a first output data enable signal DEM_L, based on the first input image data RGB_L and the first input data enable signal DE_L. The second stereopsis depth adjuster 310b may generate second output image data RGBM_R and a second output data enable signal DEM_R, based on the second input image data RGB_R and the second input data enable signal DE_R.

The first stereopsis depth adjuster 310a may set the first output data enable signal DEM_L to be delayed from the first input data enable signal DE_L, or the second stereopsis depth adjuster 310b may set the second output data enable signal DEM_R to be delayed from the second input data enable signal DE_R, so that the display device DD may adjust a position of the first object or the second object.

Although an output data enable signal delayed relative to an input data enable signal is described as an example, embodiments are not limited thereto. In an embodiment, an output data signal may be advanced relative to an input data enable signal.

For example, in order to achieve a stereopsis depth decrease of an object, the first stereopsis depth adjuster 310a may set a phase of the first output data enable signal DEM_L to be substantially equal to a phase of the first input data enable signal DE_L, and the second stereopsis depth adjuster 310b may set a phase of the second output data enable signal DEM_R to be delayed from a phase of the second input data enable signal DE_R (see, e.g., FIGS. 6 to 10).

In another example, in order to achieve a stereopsis depth increase of an object, the first stereopsis depth adjuster 310a may set a phase of the first output data enable signal DEM_L to be delayed from a phase of the first input data enable signal DE_L, and the second stereopsis depth adjuster 310b may set a phase of the second output data enable signal DEM_R to be substantially equal to a phase of the second input data enable signal DE_R (see, e.g., FIGS. 11 to 15).

Figure 16:
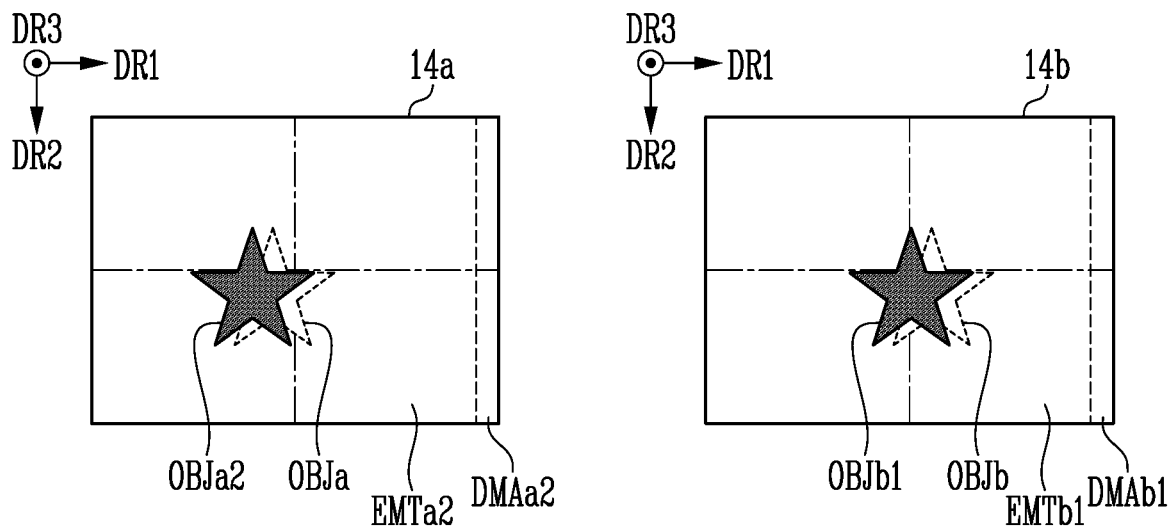
FIG. 16 is a conceptual diagram illustrating an embodiment in which an object is moved while the stereopsis depth of the object is maintained.

In still another example, in order to move an object while maintaining a stereopsis depth of the object, a first time for which the first stereopsis depth adjuster 310a allows a phase of the first output data enable signal DEM_L to be delayed from a phase of the first input data enable signal DE_L and a second time for which the second stereopsis depth adjuster 310b allows a phase of the second output data enable signal DEM_R to be delayed from a phase of the second input data enable signal DE_R may be set substantially equal to each other (see, e.g., FIG. 16).

The first sub-display device 10a may include a first display driver 210a and a first display panel 110a. The first sub-display device 10a may display the first object, based on the first output image data RGBM_L and the first output data enable signal DEM_L. The first display driver 210a may receive the first output image data RGBM_L and the first output data enable signal DEM_L from the first stereopsis depth adjuster 310a, and control the first display panel 110a to display the first object, based on the first output image data RGBM_L and the first output data enable signal DEM_L. A configuration of the first display driver 210a and the first display panel 110a may be described in greater detail with reference to FIGS. 2 to 4.

The second sub-display device 10b may include a second display driver 210b and a second display panel 110b. The second sub-display device 10b may display the second object, based on the second output image data RGBM_R and the second output data enable signal DEM_R. The second display driver 210b may receive the second output image data RGBM_R and the second output data enable signal DEM_R from the second stereopsis depth adjuster 310b, and control the second display panel 110b to display the second object, based on the second output image data RGBM_R and the second output data enable signal DEM_R. A configuration of the second display driver 210b and the second display panel 110b may be substantially the same as the configuration of the first display driver 210a and the first display panel 110a (see, e.g., FIGS. 2 to 4), and therefore, overlapping descriptions may be omitted.

The display device DD may be or include a pair of augmented reality (AR) glasses. The first display panel 110a is a display for a left eye, and a left eye of a user may view the first object. The second display panel 110b is a display for a right eye, and a right eye of the user may view the second object. As the first object and the second object overlap with each other, the user can recognize a final object. The display device DD may express a stereopsis depth of the object by using a binocular disparity of the first object and the second object.

Figure 2:
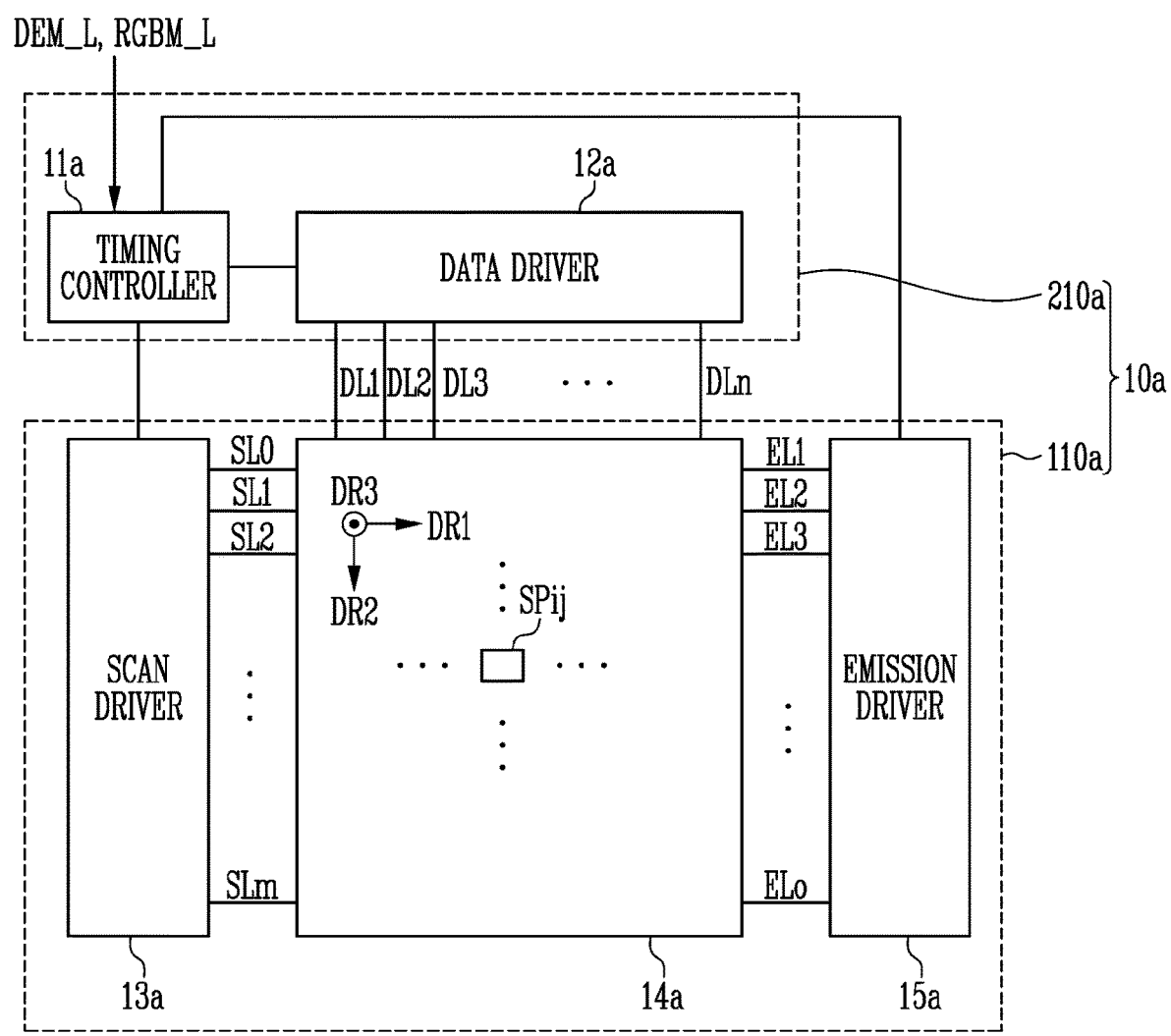
FIG. 2 is a block diagram illustrating a first sub-display device in accordance with an embodiment of the present disclosure.

FIG. 2 illustrates a first sub-display device in accordance with an embodiment of the present disclosure.

Referring to FIG. 2, the first sub-display device 10a, in accordance with the embodiment of the present disclosure, may include a timing controller 11a, a data driver 12a, a scan driver 13a, a first pixel unit 14a, and an emission driver 15a.

A first display driver 210a may include the timing controller 11a and the data driver 12a. The timing controller 11a and the data driver 12a may be implemented in one integrated circuit, or may be implemented in two integrated circuits separated from each other. The first display driver 210a may be electrically connected to a first display panel 110a.

The first display panel 110a may include the scan driver 13a, the first pixel unit 14a, and the emission driver 15a. The scan driver 13a, the first pixel unit 14a, and the emission driver 15a may be mounted on one substrate.

However, in some embodiments, the timing controller 11a, the data driver 12a, the scan driver 13a, and the emission driver 13a may be configured as one integrated circuit. In addition, the emission driver 15a may be unnecessary according to a structure of the first pixel unit 14a.

The timing controller 11a may receive first output image data RGBM_L, a first output data enable signal DEM_L, and other control signals. When the first output data enable signal DEM_L has an enable level, the timing controller 11a may receive the first output image data RGBM_L. When the first output data enable signal DEM_L has a disable level, the timing controller 11a need not receive the first output image data RGBM_L.

The timing controller 11a may render color grayscales included in the first output image data RGBM_L to correspond to the structure of the first pixel unit 14a, and provide the rendered color grayscales to the data driver 12a. Moreover, the timing controller 11a may provide the scan driver 13a with a clock signal, a scan start signal, and the like. The timing controller 11a may provide the emission driver 15a with a clock signal, an emission stop signal, and the like.

The data driver 12a may generate data voltages to be provided to data lines DL1, DL2, DL3, . . . , and DLn by using the color grayscales and control signals, which are received from the timing controller 11a. For example, the data driver 12a may sample the color grayscales by using a clock signal, and apply data voltages corresponding to the color grayscales to the data lines DL1 to DLn in units of pixel rows. Here, n may be an integer greater than 1. A pixel row means sub-pixels connected to substantially the same scan line and substantially the same emission line.

The scan driver 13a may generate scan signals to be provided to scan lines SL0, SL1, SL2, . . . , and SLm by receiving the clock signal, the scan start signal, and the like from the timing controller 11a. For example, the scan driver 13a may sequentially provide scan signals having a pulse of a turn-on level to the scan lines SL0 to SLm. For example, the scan driver 13a may be configured in the form of shift registers, and generate the scan signals in a manner that sequentially transfers the scan start signal in the form of a pulse of the turn-on level to a next stage circuit under the control of the clock signal. Here, m may be an integer greater than 1.

The emission driver 15a may generate emission signals to be provided to emission lines EL1, EL2, EL3, . . . , ELo by receiving the clock signal, the emission stop signal, and the like from the timing controller 11a. For example, the emission driver 15a may sequentially provide emission signals having a pulse of a turn-off level to the emission lines EL1 to ELo. For example, the emission driver 15a may be configured in the form of shift registers, and generate the emission signals in a manner that sequentially transfers the emission stop signal in the form of a pulse of the turn-off level to a next stage circuit under the control of the clock signal. Here, o may be an integer greater than 1.

The first pixel unit 14a may include sub-pixels. Each sub-pixel SPij may be connected to a corresponding data line, a corresponding scan line, and a corresponding emission line. Here, each of i and j may be an integer greater than 0. The sub-pixel SPij may mean a sub-pixel in which a scan transistor is connected to an ith scan line and a jth data line.

The first pixel unit 14a may include sub-pixels emitting light of a first color, sub-pixels emitting light of a second color, and sub-pixels emitting light of a third color. The sub-pixels of the first pixel unit 14a may be arranged in various forms including diamond PENTILE™, RGB-stripe, S-stripe, real RGB, normal PENTILE™, and the like.

It is assumed that the sub-pixels of the first sub-pixel 14a are arranged in a first direction DR1 and a second direction DR2 perpendicular to the first direction DR1, without limitation thereto. Moreover, it is assumed that the emission direction of the sub-pixels is a third direction DR3 perpendicular to the first direction DR1 and the second direction DR2, without limitation thereto. It is assumed that, in the first pixel unit 14a, the data lines DL1 to DLn extend in the second direction DR2 and are arranged in parallel to each other in the first direction DR1, without limitation thereto. It is assumed that, in the first pixel unit 14a, the scan lines SL0 to SLm extend in the first direction DR1 and are arranged in parallel to each other in the second direction DR2, without limitation thereto. It is assumed that, in the first pixel unit 14a, the emission lines EL1 to ELo extend in the first direction DR1 and are arranged in parallel to each other in the second direction DR2, without limitation thereto.

Figure 3:
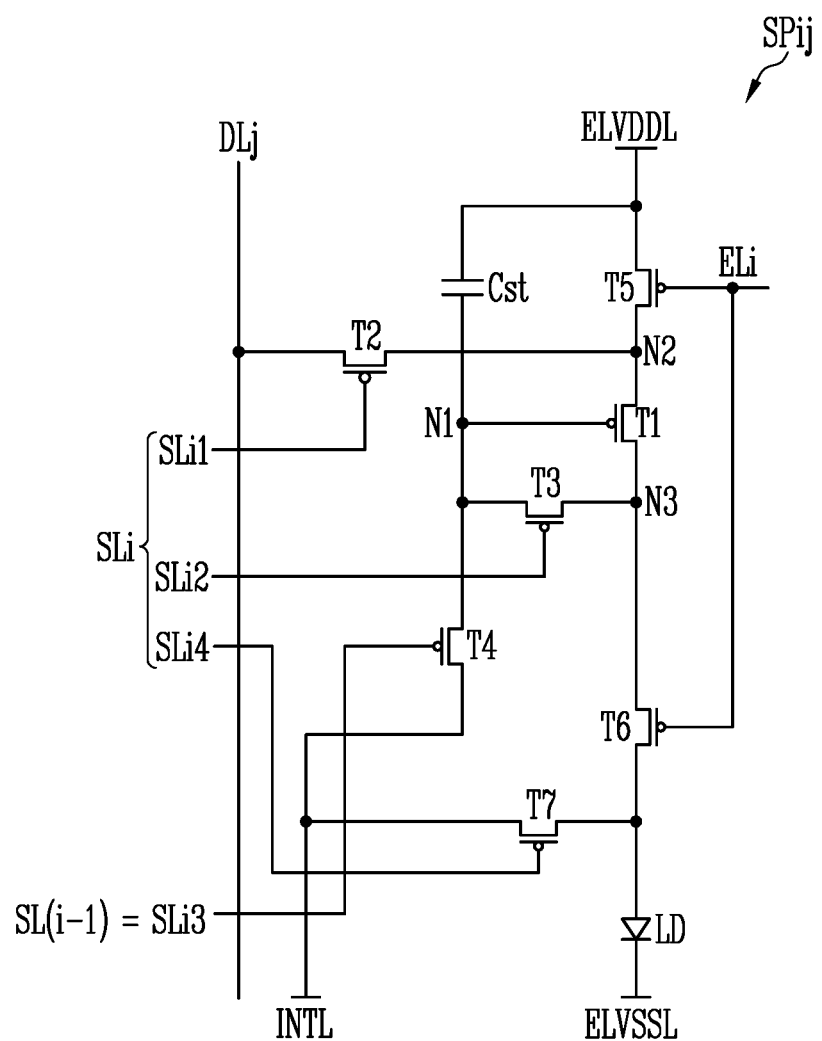
FIG. 3 is a circuit diagram illustrating a sub-pixel in accordance with an embodiment of the present disclosure.

FIG. 3 illustrates a sub-pixel in accordance with an embodiment of the present disclosure.

Referring to FIG. 3, the sub-pixel SPij may include transistors T1, T2, T3, T4, T5, T6, and T7, a storage capacitor Cst, and a light-emitting element LD.

Hereinafter, a circuit implemented with a P-type transistor is described as an example, without limitation thereto. However, those skilled in the art may design a circuit implemented with an N-type transistor by changing the polarity of a voltage applied to a gate terminal, for example. Similarly, those skilled in the art may design a circuit implemented with a combination of P-type and N-type transistors. The P-type transistor is commonly summarized as a transistor in which a current amount increases when a voltage difference between a gate electrode and a source electrode increases in a negative direction. The N-type transistor is commonly summarized as a transistor in which a current amount increases when a voltage difference between a gate electrode and a source electrode increases in a positive direction. The transistor may be configured in various forms including a Thin-Film Transistor (TFT), a Field-Effect Transistor (FET), a Bipolar Junction Transistor (BJT), and the like.

A gate electrode of the first transistor T1 may be connected to a first node N1, a first electrode of the first transistor T1 may be connected to a second node N2, and a second electrode of the first transistor T1 may be connected to a third node N3. The first transistor T1 may be referred to as a driving transistor.

A gate electrode of a second transistor T2 may be connected to a scan line SLi1, a first electrode of the second transistor T2 may be connected to a data line DLj, and a second electrode of the second transistor T2 may be connected to the second node N2. The second transistor T2 may be referred to as a scan transistor.

A gate electrode of a third transistor T3 may be connected to a scan line SLi2, a first electrode of the third transistor T3 may be connected to the first node N1, and a second electrode of the third transistor T3 may be connected to the third node N3. The third transistor T3 may be referred to as a diode connection transistor.

A gate electrode of a fourth transistor T4 may be connected to a scan line SLi3 that may provide a scan signal from the previous scan period, a first electrode of the fourth transistor T4 may be connected to the first node N1, and a second electrode of the fourth transistor T4 may be connected to an initialization line INTL. The fourth transistor T4 may be referred to as a gate initialization transistor.

A gate electrode of the fifth transistor T5 may be connected to an ith emission line ELi, a first electrode of the fifth transistor T5 may be connected to a first power line ELVDDL, and a second electrode of the fifth transistor T5 may be connected to the second node N2. The fifth transistor T5 may be referred to as an emission transistor. In an embodiment, the gate electrode of the fifth transistor T5 may be an emission line different from that connected to a gate electrode of a sixth transistor T6.

The gate electrode of the sixth transistor T6 may be connected to the ith emission line ELi, a first electrode of the sixth transistor T6 may be connected to the third node N3, and a second electrode of the sixth transistor T6 may be connected to an anode of the light-emitting element LD. The sixth transistor T6 may be referred to as an emission transistor. In an embodiment, the gate electrode of the sixth transistor T6 may be connected to an emission line different from that connected to the gate electrode of the fifth transistor T5.

A gate electrode of a seventh transistor T7 may be connected to a scan line SLi4, a first electrode of the seventh transistor T7 may be connected to an initialization line INTL, and a second electrode of the seventh transistor T7 may be connected to the anode of the light-emitting element LD. The seventh transistor T7 may be referred to as a light-emitting element initialization transistor.

A first electrode of the storage capacitor Cst may be connected to the first power line ELVDDL, and a second electrode of the storage capacitor Cst may be connected to the first node N1.

The anode of the light-emitting element LD may be connected to the second electrode of the sixth transistor T6, and a cathode of the light-emitting element LD may be connected to a second power line ELVSSL. The light-emitting element LD may be a light-emitting diode. The light-emitting element LD may be configured as an organic light-emitting diode, an inorganic light-emitting diode, a quantum dot/well light-emitting diode, or the like. In this embodiment, one light-emitting element LD is provided in each sub-pixel. However, in an embodiment, a plurality of light-emitting elements may be provided in each sub-pixel. The plurality of light-emitting elements may be connected in series, parallel, series/parallel, or the like. The light-emitting element LD of each sub-pixel SPij may emit light of one of a first color, a second color, and a third color.

A first power voltage may be applied to the first power line ELVDDL, a second power voltage may be applied to the second power line ELVSSL, and an initialization voltage may be applied to the initialization line INTL. For example, the first power voltage may be higher than the second power voltage. For example, the initialization voltage may be substantially equal to or higher than the second power voltage. For example, the initialization voltage may correspond to a data voltage having the smallest magnitude among magnitudes of data voltages corresponding to color grayscales. In another example, the magnitude of the initialization voltage may be smaller than the magnitudes of the data voltages corresponding to the color grayscales.

Figure 4:
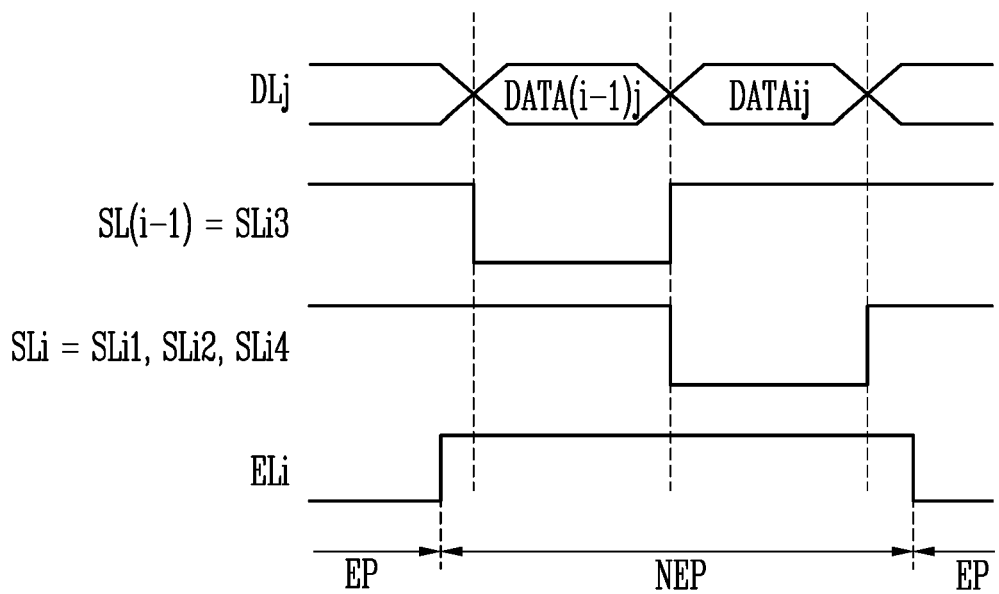
FIG. 4 is a timing diagram illustrating a driving method of the sub-pixel shown in FIG. 3.

FIG. 4 illustrates a driving method of the sub-pixel shown in FIG. 3.

Hereinafter, for convenience of description, it is assumed that the scan lines SLi1, SLi2, and SLi4 correspond to an ith scan line SLi, and the scan line SLi3 corresponds to an (i−1)th scan line SL(i−1), without limitation thereto. However, in some embodiments, a connection relationship between the scan lines SLi1, SLi2, SLi3, and SLi4 may be diverse. For example, the scan line SLi4 may be an (i−1)th scan line or an (i+1)th scan line.

An emission signal having a turn-off level (e.g., logic high level) is applied to the ith emission line ELi, a data voltage DATA(i−1)j for an (i−1)th sub-pixel is applied to the data line DLj, and a scan signal having a turn-on level (e.g., logic low level) is applied to the scan line SLi3. High/low of a logic level may be changed according to whether a transistor is of a P-type or an N-type.

Since a scan signal having the turn-off level is applied to the scan lines SLi1 and SLi2, the second transistor T2 is in a turn-off state, so the data voltage DATA(i−1)j for the (i−1)th sub-pixel is prevented from being input to an ith sub-pixel SPij.

Since the fourth transistor T4 is in a turn-on state, the first node N1 is connected to the initialization line INTL, so that a voltage of the first node N1 is initialized. Since the emission signal having the turn-off level is applied to the emission line ELi, the transistors T5 and T6 are in the turn-off state, so unnecessary emission of the light-emitting element LD is prevented in a process of applying the initialization voltage.

A data voltage DATAij for the ith pixel SPij is applied to the data line DLj, and the scan signal having the turn-on level is applied to the scan lines SLi1 and SLi2. Accordingly, the transistors T2, T1, and T3 are in a conduction state, and the data line DLj and the first node N1 are electrically connected to each other. Therefore, a compensation voltage obtained by subtracting a threshold voltage of the first transistor T1 from the data voltage DATAij is applied to the second electrode of the storage capacitor Cst (e.g., the first node N1), and the storage capacitor Cst maintains a voltage corresponding to the difference between the first power voltage and the compensation voltage. Such a period may be referred to as a threshold voltage compensation period or a data write period.

In addition, when the scan line SLi4 is an ith scan line, the seventh transistor T7 is in the turn-on state. Hence, the anode of the light-emitting element LD and the initialization line INTL are connected to each other, so the light-emitting element LD is initialized to a charge amount corresponding to the voltage difference between the initialization voltage and the second power voltage.

As the emission signal having the turn-on level is applied to the ith emission line ELi, the transistors T5 and T6 may be electrically connected to each other. Therefore, a driving current path is formed, through which the first power line ELVDDL, the fifth transistor T5, the first transistor T1, the sixth transistor T6, the light-emitting element LD, and the second power line ELVSSL are connected to each other.

An amount of driving current flowing through the first electrode and the second electrode of the first transistor T1 is adjusted according to the voltage maintained in the storage capacitor Cst. The light-emitting element LD emits light with a luminance corresponding to the amount of driving current. The light-emitting element LD emits light until the emission signal having the turn-off level is applied to the emission line ELi.

When an emission signal has the turn-on level, sub-pixels receiving the corresponding emission signal may be in a display state. Therefore, the period in which the emission signal has the turn-on level may be referred to as an emission period EP (e.g., an emission allow period). In addition, when an emission signal has the turn-off level, sub-pixels receiving the corresponding emission signal may be in a non-display state. Thus, the period in which the emission signal has the turn-off level may be referred to as a non-emission period NEP (e.g., an emission inhibit period).

The non-emission period NEP described in FIG. 4 is used to prevent the sub-pixel SPij from emitting light with an unwanted luminance while passing through the initialization period and the data write period.

One or more non-emission periods NEP may be additionally provided while data written to the sub-pixel SPij is maintained (e.g., one frame period). This may lead to reducing the emission period EP of the sub-pixel SPij, thereby effectively expressing a low grayscale or gently blurring motion of an image.

Figure 5:
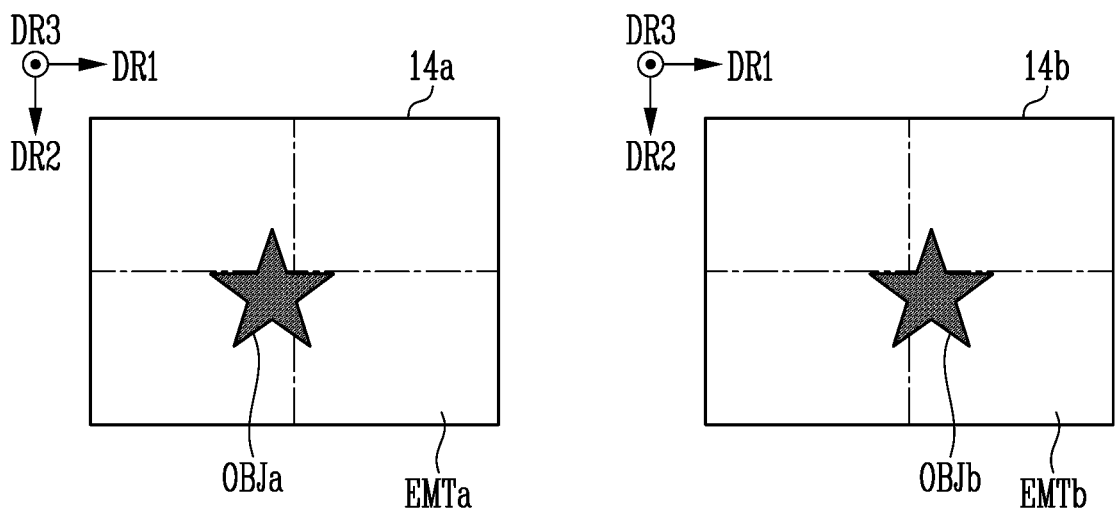
FIG. 5 is a conceptual diagram illustrating a first object which the first sub-display device displays and a second object which a second sub-display device displays.

FIG. 5 illustrates a first object which the first sub-display device displays and a second object which a second sub-display device displays.

The first pixel unit 14a may display a first image. The first image may be a left-eye image. For example, the first image may include a first object OBJa and a null area EMTa. When the first pixel unit 14a is a transparent display, an external environment may be viewed by a left eye of a user through the null area EMTa, and the first object OBJa may be viewed by the left eye of the user to overlap with the external environment. In another example, when the first pixel unit 14a is not the transparent display, the first image and a background image may be displayed while overlapping with each other. For convenience of description, for example, it is assumed that the first object OBJa is located in the opposite direction of the first direction DR1 at the center of a screen, without limitation thereto.

A second pixel unit 14b may display a second image. The second image may be a right-eye image. For example, the second image may include a second object OBJb and a null area EMTb. For example, when the second pixel unit 14b is a transparent display, the external environment may be viewed by a right eye of the user through the null area EMTb, and the second object OBJb may be viewed by the right eye of the user to overlap with the external environment. In another example, when the second pixel unit 14b is not the transparent display, the second image and the background image may be displayed while overlapping with each other. For convenience of description, for example, it is assumed that the second object OBJb is located in the first direction DR1 at the center of the screen, without limitation thereto.

The user may feel a stereopsis depth of a finally viewed object due to a relative position difference of the first object OBJa and the second object OBJb. As a relative distance of the first object OBJa and the second object OBJb becomes larger, the stereopsis depth of the object, which the user feels, may become larger. As the relative distance of the first object OBJa and the second object OBJb becomes smaller, the stereopsis depth of the object, which the user feels, may become smaller.

FIGS. 6 to 10 illustrate an embodiment in which the stereopsis depth of an object is decreased.

Figure 6:
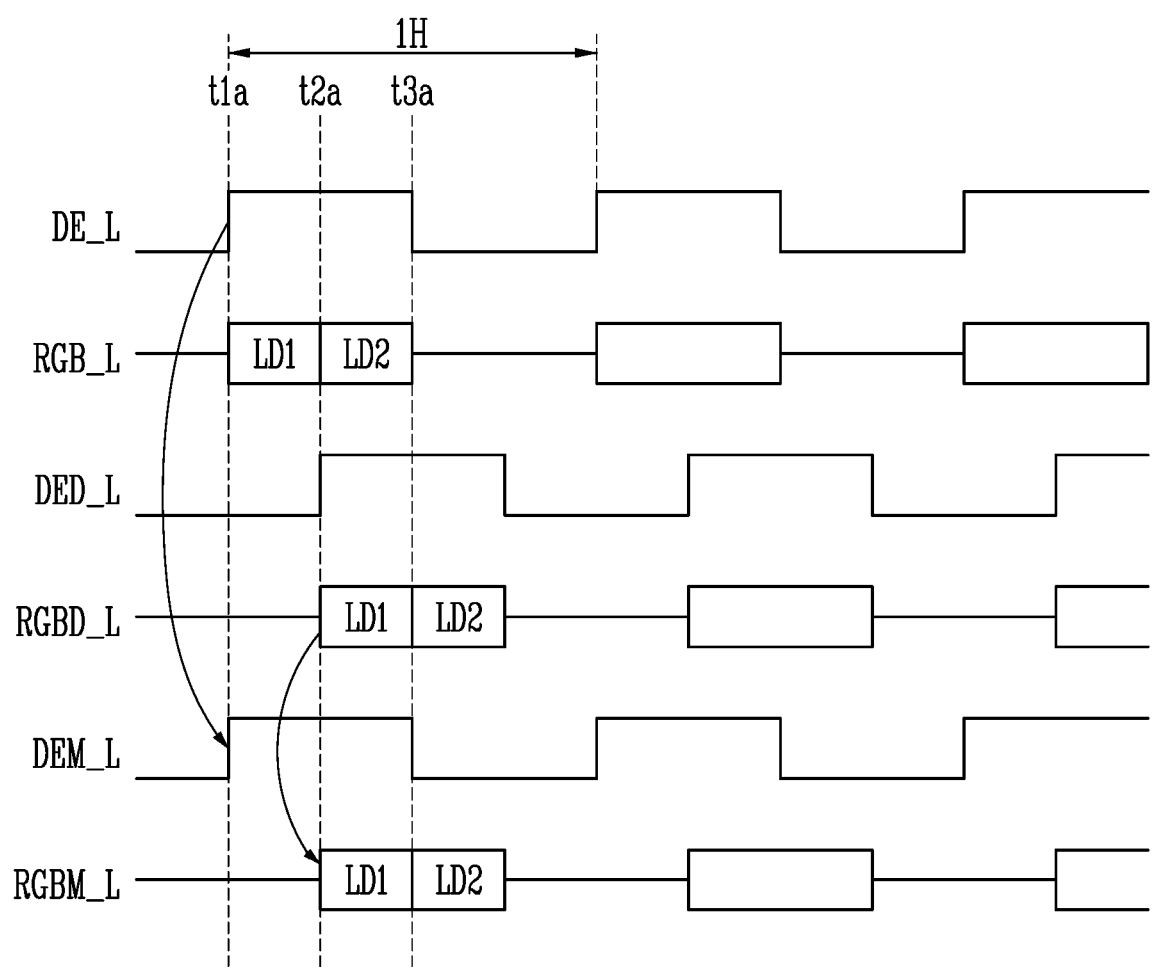
FIGS. 6 to 9 are timing diagrams illustrating an embodiment in which the stereopsis depth of an object is decreased.

Referring to FIG. 6, the first stereopsis depth adjuster 310 may generate first output image data RGBM_L and a first output data enable signal DEM_L, based on first input image data RGB_L and a first input data enable signal DE_L. In the first input data enable signal DE_L, an enable level (e.g., a high level) and a disable level (e.g., a low level) may be repeated using one horizontal period 1H as a cycle.

The first stereopsis depth adjuster 310a may generate a first delay data enable signal DED_L by delaying the first input data enable signal DE_L. With respect to the first input data enable signal DE_L, the first delay data enable signal DED_L may be delayed by a period t1a to t2a. Meanwhile, the first stereopsis depth adjuster 310a may generate first delay image data RGBD_L by delaying the first input image data RGB_L. With respect to the first input image data RGB_L, the first delay image data RGBD_L may be delayed by the period t1a to t2a.

The first stereopsis depth adjuster 310a may set a phase of the first output data enable signal DEM_L to be substantially equal to a phase of the first input data enable signal DE_L. For example, the first stereopsis depth adjuster 310a may determine, as the first output data enable signal DEM_L, the first input data enable signal DE_L selected from the first input data enable signal DE_L and the first delay data enable signal DED_L.

Moreover, the first stereopsis depth adjuster 310a may set the first output image data RGBM_L to be delayed from the first input image data RGB_L. For example, the first stereopsis depth adjuster 310a may determine, as the first output image data RGBM_L, the first delay image data RGBD_L selected from the first input image data RGB_L and the first delay image data RGBD_L.

As described above, the first sub-display device 10a receives the first output data enable signal DEM_L and the first output image data RGBM_L. The first sub-display device 10a may determine that the first output image data RGBM_L received during a period t1a to t3a in which the first output data enable signal DEM_L has an enable level (e.g., a high level) is valid. Therefore, the first sub-display device 10a may neglect grayscale data LD2 of the first output image data RGBM_L received after a time t3a.

The first output image data RGBM_L may have basic data during the period t1a to t2a. Although the basic data may vary according to a setting, it is assumed that the basic data is a null data, without limitation thereto. The first output image data RGBM_L may have grayscale data LD1 during a period t2a to t3a. That is, the first sub-display device 10a may display a first object, based on the null data and the delayed grayscale data LD1.

Figure 10:
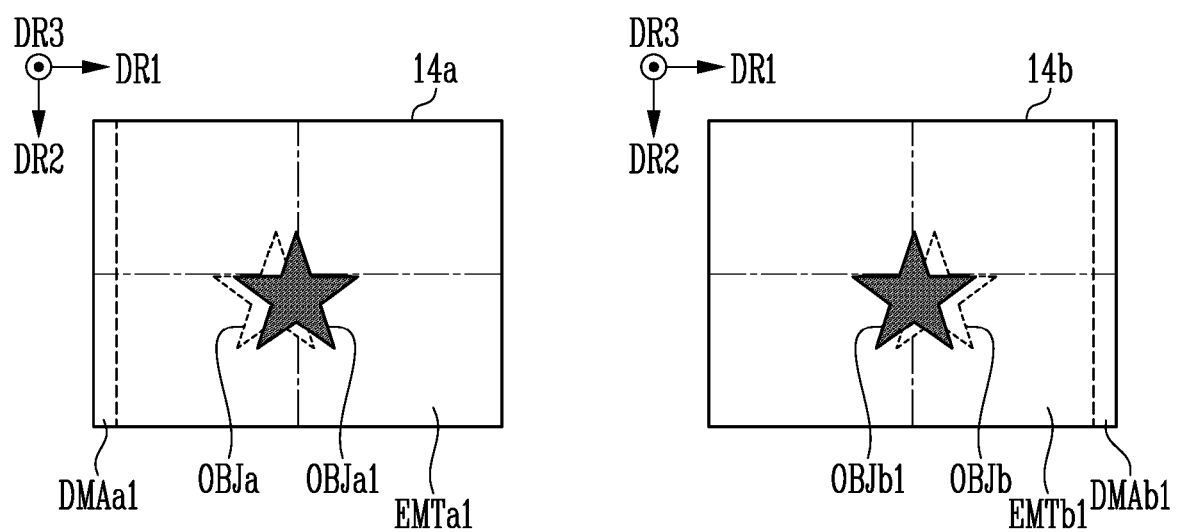
FIG. 10 is a conceptual diagram illustrating the embodiment of FIGS. 6 to 9.

Referring to FIG. 10, a null area DMAa1 may be added based on the null data of the period t1a to t2a. The null area DMAa1 may be a partial area in contact with a side surface of the first pixel unit 14a in the opposite direction of the first direction DR1. A first object OBJa1 and a null area EMTa1, which are based on the grayscale data LD1 of the period t2a to t3a, may be located in the first direction DR1 with respect to the first object OBJa and the null area EMTa, which are based on the first input image data RGB_L.

Figure 7:
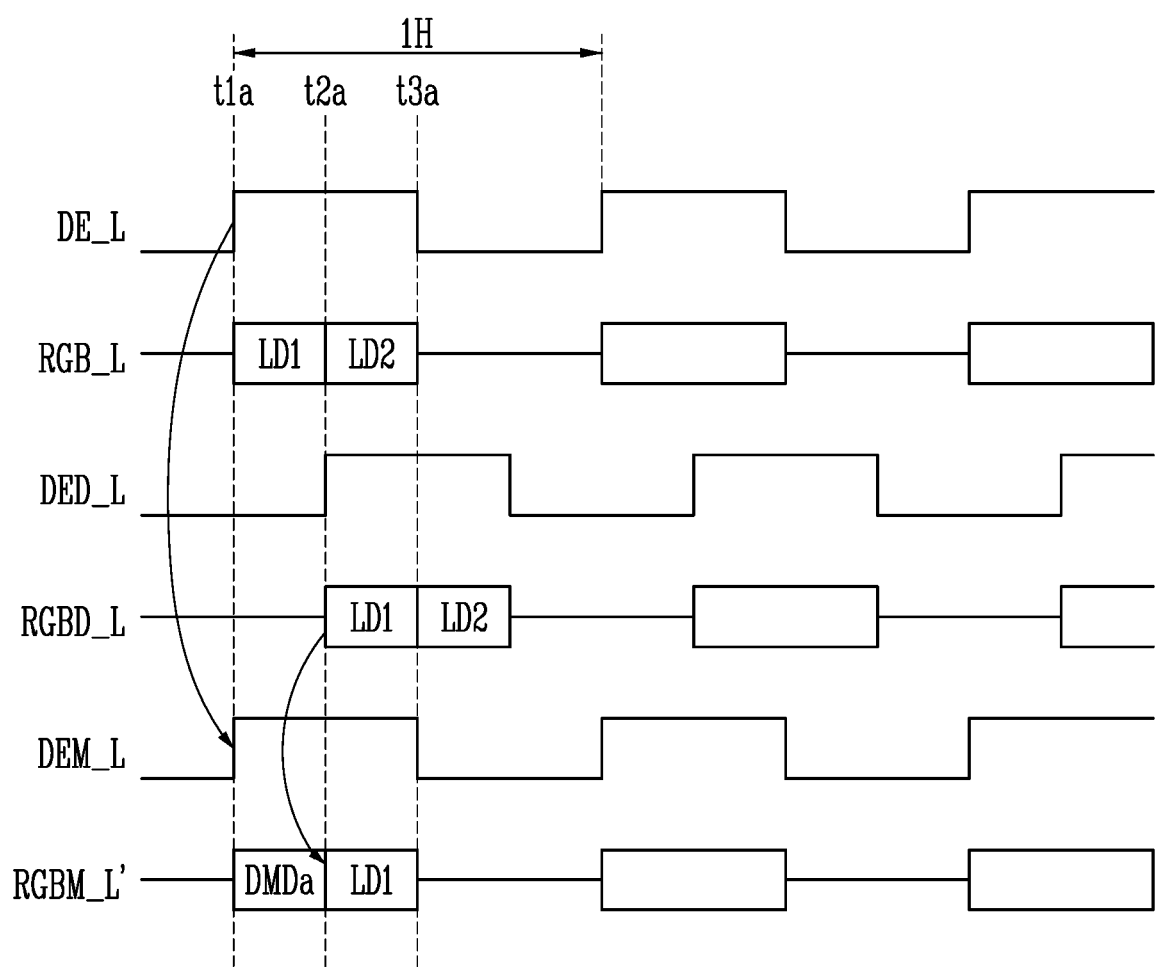

Another example of a first output image data RGBM_L' is described with reference to FIG. 7. The basic data need not be the null data during the period t1a to t2a. The first stereopsis depth adjuster 310a may generate first output image data RGBM_L' by removing a portion LD2 of the first delay image data RGBD_L and adding null data DMDa prior to the portion LD1 of the first delay image data RGBD_L. That is, the first stereopsis depth adjuster 310a may set a portion LD1 of the first output image data RGBM_L' to be substantially equal to a portion LD1 of the first input image data RGB_L, and add the null data DMDa prior to the portion LD1 of the first output image data RGBM_L'. Moreover, the first stereopsis depth adjuster 310a may set the first output image data RGBM_L' not to include a portion LD2 of the first input image data RGB_L.

Figure 8:
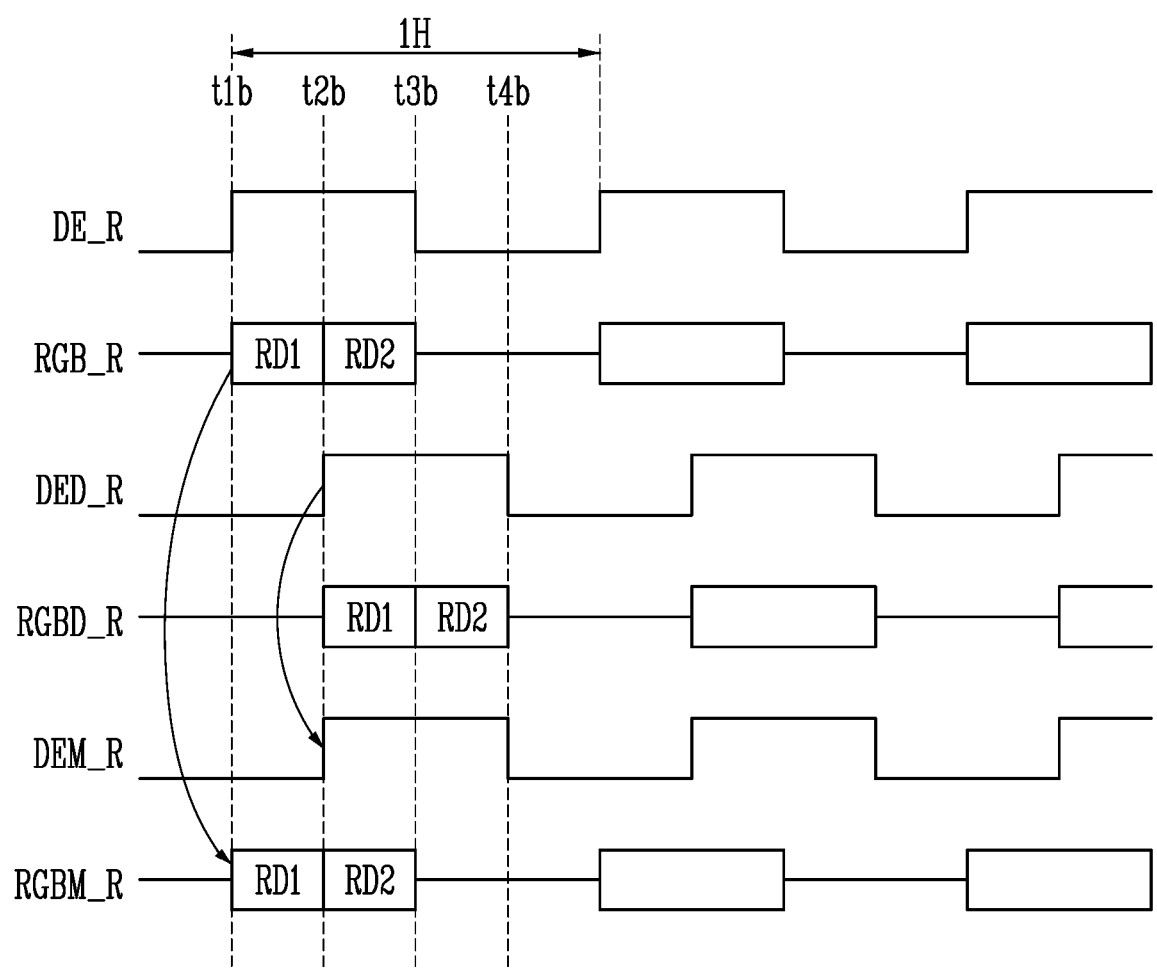

Referring to FIG. 8, the second stereopsis depth adjuster 310b may generate second output image data RGBM_R and a second output data enable signal DEM_R, based on second input image data RGB_R and a second input data enable signal DE_R. In the second input data enable signal DE_R, an enable level (e.g., a high level) and a disable level (e.g., a low level) may be repeated using one horizontal period 1H as a cycle.

The second stereopsis depth adjuster 310b may generate a second delay data enable signal DED_R by delaying the second input data enable signal DE_R. With respect to the second input data enable signal DE_R, the second delay data enable signal DED_R may be delayed by a period t1b to t2b. Meanwhile, the second stereopsis depth adjuster 310b may generate second delay image data RGBD_R by delaying the second input image data RGB_R. With respect to the second input image data RGB_R, the second delay image data RGBD_R may be delayed by the period t1b to t2b.

The second stereopsis depth adjuster 310b may set the second output data enable signal DEM_R to be delayed from the second input data enable signal DE_R. For example, the second stereopsis depth adjuster 310b may determine, as the second output data enable signal DEM_R, the second delay data enable signal DED_R selected from the second input data enable signal DE_R and the second delay data enable signal DED_R.

Moreover, the second stereopsis depth adjuster 310b may set the second output image data RGBM_R to be substantially equal to the second input image data RGB_R. For example, the second stereopsis depth adjuster 310b may determine, as the second output image data RGBM_R, the second input image data RGB_R selected from the second input image data RGB_R and the second delay image data RGBD_R.

As described above, the second sub-display device 10b receives the second output data enable signal DEM_R and the second output image data RGBM_R. The second sub-display device 10b may determine that the second output image data RGBM_R received during a period t2b to t4b in which the second output data enable signal DEM_R has an enable level (e.g., a high level) is valid. Therefore, the second sub-display device 10b may neglect grayscale data RD1 of the second output image data RGBM_R received before a time t2b.

The second output image data RGBM_R may have grayscale data RD2 during the period t2b to t3b. The second output image data RGBM_R may have basic data during the period t3b to t4b. Although the basic data may vary according to a setting, it is assumed that the basic data is a null data, without limitation thereto. That is, the second sub-display device 10b may display a second object, based on the advanced grayscale data RD2 and the null data.

Referring to FIG. 10, a null area DMAb1 may be added based on the null data of the period t3b to t4b. The null area DMAb1 may be a partial area in contact with a side surface of the second pixel unit 14b in the first direction DR1. A second object OBJb1 and a null area EMTb1, which are based on the grayscale data RD2 of the period t2b to t3b, may be located in the opposite direction of the first direction DR1 with respect to the second object OBJb and the null area EMTb, which are based on the second input image data RGB_R.

Figure 9:
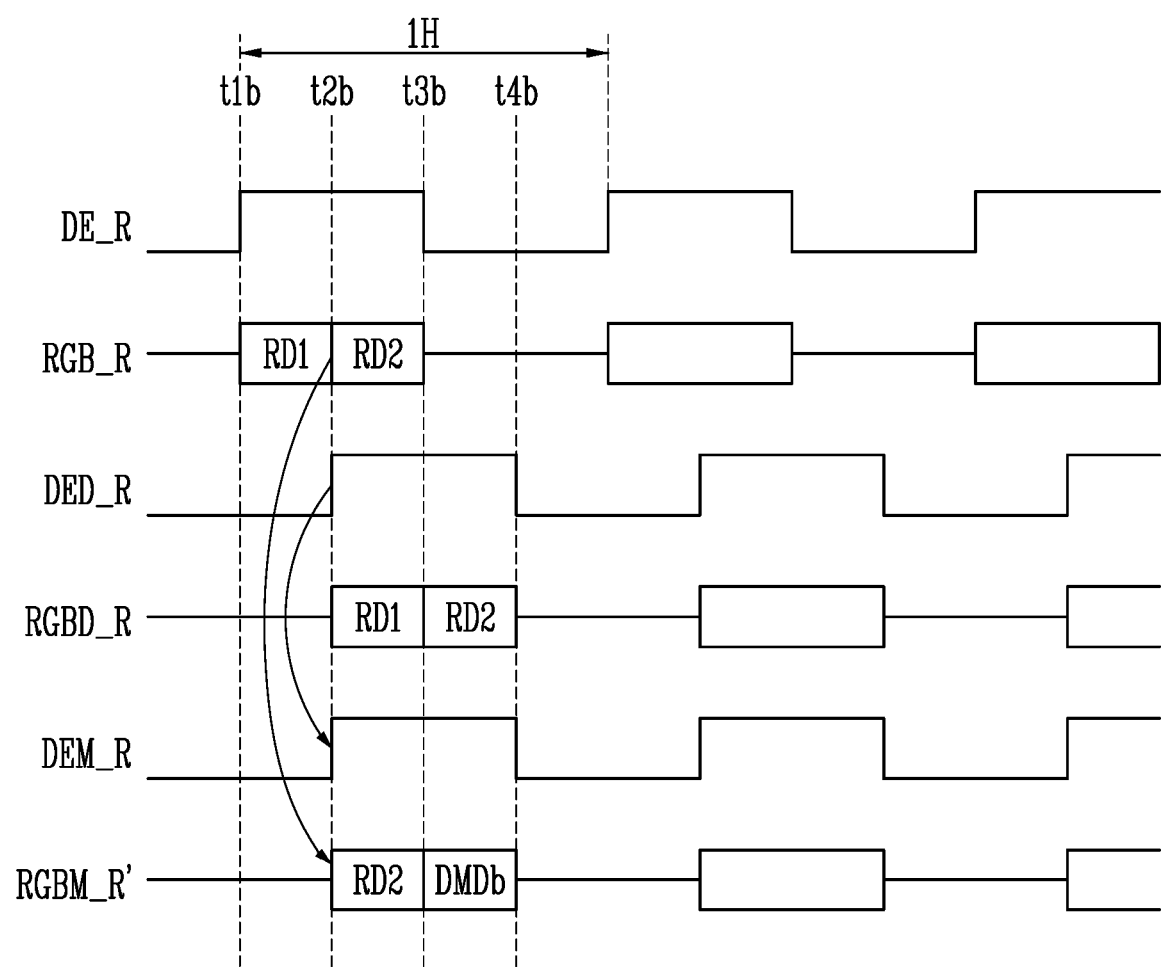

Another example of a second output image data RGBM_R' is described with reference to FIG. 9. The basic data need not be the null data during the period t3b to t4b. The second stereopsis depth adjuster 310b may generate second output image data RGBM_R' by removing a portion RD1 of the second input image data RGB_R and adding null data DMDb subsequent to a portion RD2 of the second input image data RGB_R. That is, the second stereopsis depth adjuster 310b may set a portion RD2 of the second output image data RGBM_R' to be substantially equal to the portion RD2 of the second input image data RGB_R, and add the null data DMDb subsequent to the portion RD2 of the second output image data RGBM_R'. Moreover, the second stereopsis depth adjuster 310b may set the second output image data RGBM_R' not to include the portion RD1 of the second input image data RGB_R.

Referring to FIG. 10, it can be seen that a relative distance between the first object OBJa1 and the second object OBJb1 has become shorter than a relative distance between the first object OBJa and the second object OBJb. Thus, the user can view an object having a decreased stereopsis depth.

FIGS. 11 to 15 illustrate an embodiment in which the stereopsis depth of an object is increased.

Figure 11:
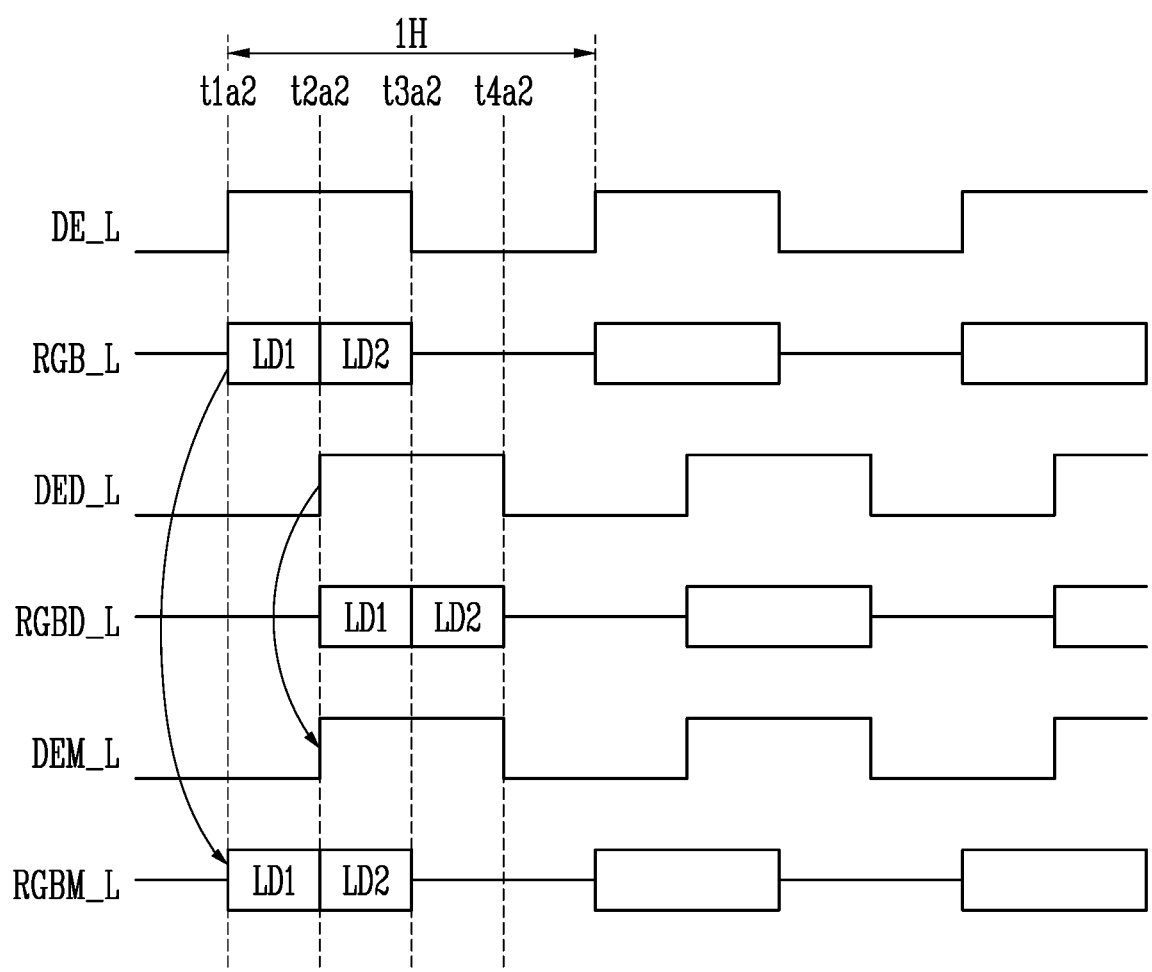
FIGS. 11 to 14 are timing diagrams illustrating an embodiment in which the stereopsis depth of an object is increased.

Referring to FIG. 11, the first stereopsis depth adjuster 310 may generate first output image data RGBM_L and a first output data enable signal DEM_L, based on first input image data RGB_L and a first input data enable signal DE_L. In the first input data enable signal DE_L, an enable level (e.g., a high level) and a disable level (e.g., a low level) may be repeated using one horizontal period 1H as a cycle.

The first stereopsis depth adjuster 310a may generate a first delay data enable signal DED_L by delaying the first input data enable signal DE_L. With respect to the first input data enable signal DE_L, the first delay data enable signal DED_L may be delayed by a period t1a2 to t2a2. Meanwhile, the first stereopsis depth adjuster 310a may generate first delay image data RGBD_L by delaying the first input image data RGB_L. With respect to the first input image data RGB_L, the first delay image data RGBD_L may be delayed by the period t1a2 to t2a2.

The first stereopsis depth adjuster 310a may set the first output data enable signal DEM_L to be delayed from the first input data enable signal DE_L. For example, the first stereopsis depth adjuster 310a may determine, as the first output data enable signal DEM_L, the first delay data enable signal DED_L selected from the first input data enable signal DE_L and the first delay data enable signal DED_L.

Moreover, the first stereopsis depth adjuster 310a may set the first output image data RGBM_L to be substantially equal to the first input image data RGB_L. For example, the first stereopsis depth adjuster 310a may determine, as the first output image data RGBM_L, the first input image data RGB_L selected from the first input image data RGB_L and the first delay image data RGBD_L.

As described above, the first sub-display device 10a receives the first output data enable signal DEM_L and the first output image data RGBM_L. The first sub-display device 10a may determine that the first output image data RGBM_L received during a period t2a2 to t4a2 in which the first output data enable signal DEM_L has an enable level (e.g., a high level) is valid. Therefore, the first sub-display device 10a may neglect grayscale data LD1 of the first output image data RGBM_L received before a time t2a2, such as from the time t1a2 to the time t2a2.

The first output image data RGBM_L may have grayscale data LD2 during a period t2a2 to t3a2. The first output image data RGBM_L may have basic data during a period t3a2 to t4a2. Although the basic data may vary according to a setting, it is assumed that the basic data is a null data, without limitation thereto. That is, the first sub-display device 10a may display a first object, based on the advanced grayscale data LD2 and the null data.

Figure 15:
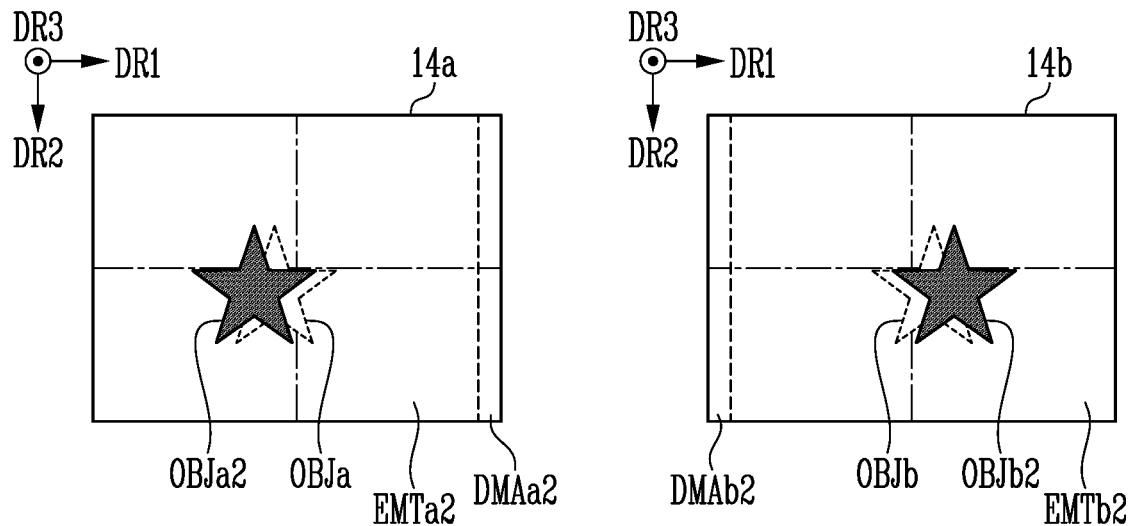
FIG. 15 is a conceptual diagram illustrating the embodiment of FIGS. 11 to 14.

Referring to FIG. 15, a null area DMAa2 may be added based on the null data of the period t3a2 to t4a2. The null area DMAa2 may be a partial area in contact with a side surface of the first pixel unit 14a in the first direction DR1. A first object OBJa2 and a null area EMTa2, which are based on the grayscale data LD2 of the period t2a2 to t3a2, may be located in the opposite direction of the first direction DR1 with respect to the first object OBJa and the null area EMTa, which are based on the first input image data RGB_L.

Figure 12:
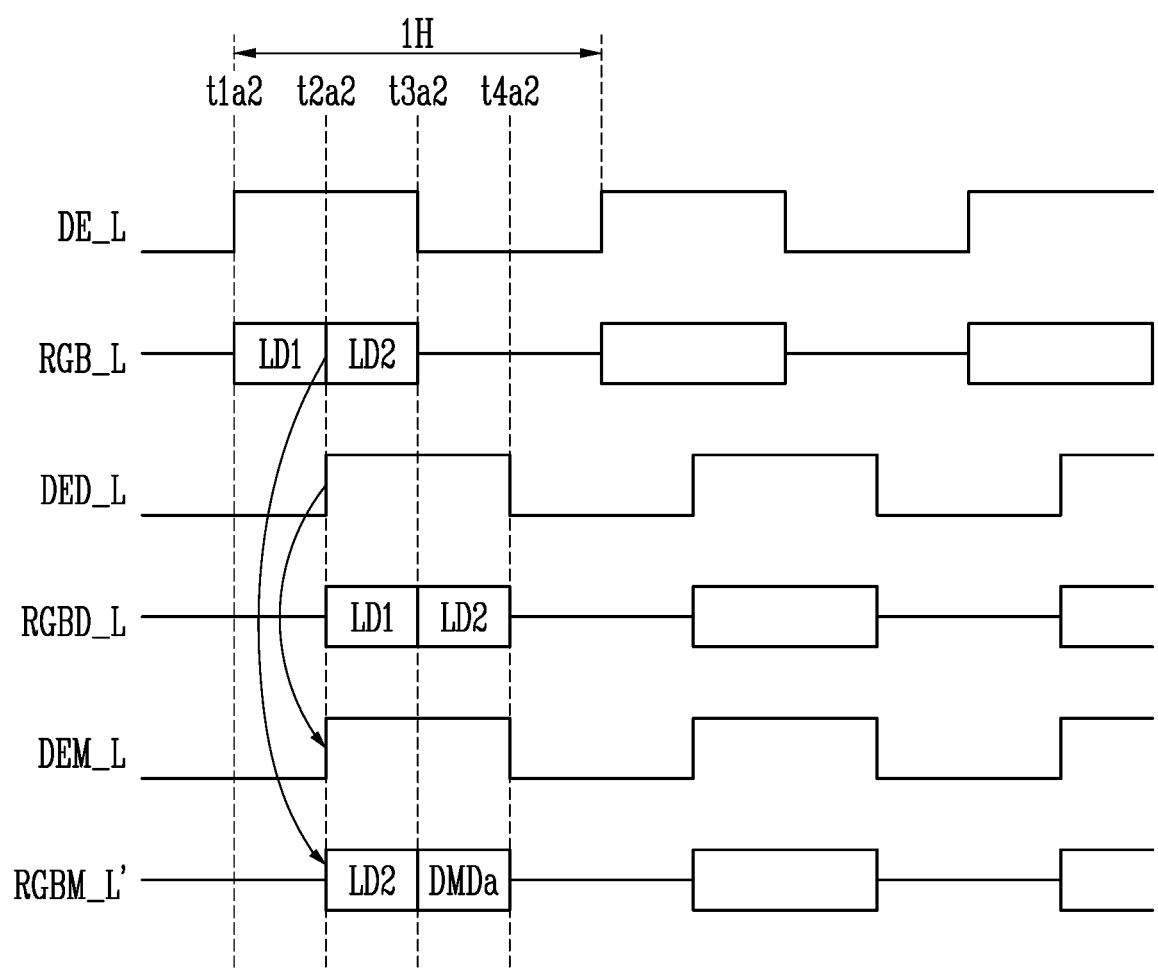

Another example of a first output image data RGBM_L' is described with reference to FIG. 12. The basic data need not be the null data during the period t3a2 to t4a2. The first stereopsis depth adjuster 310a may generate first output image data RGBM_L' by removing a portion LD1 of the first input image data RGB_L and adding null data DMDa subsequent to a portion LD2 of the first input image data RGB_L. That is, the first stereopsis depth adjuster 310a may set a portion LD2 of the first output image data RGBM_L' to be substantially equal to the portion LD2 of the first input image data RGB_L, and add the null data DMDa subsequent to the portion LD2 of the first output image data RGBM_L'. Moreover, the first stereopsis depth adjuster 310a may set the first output image data RGBM_L' not to include the portion LD1 of the first input image data RGB_L.

Figure 13:
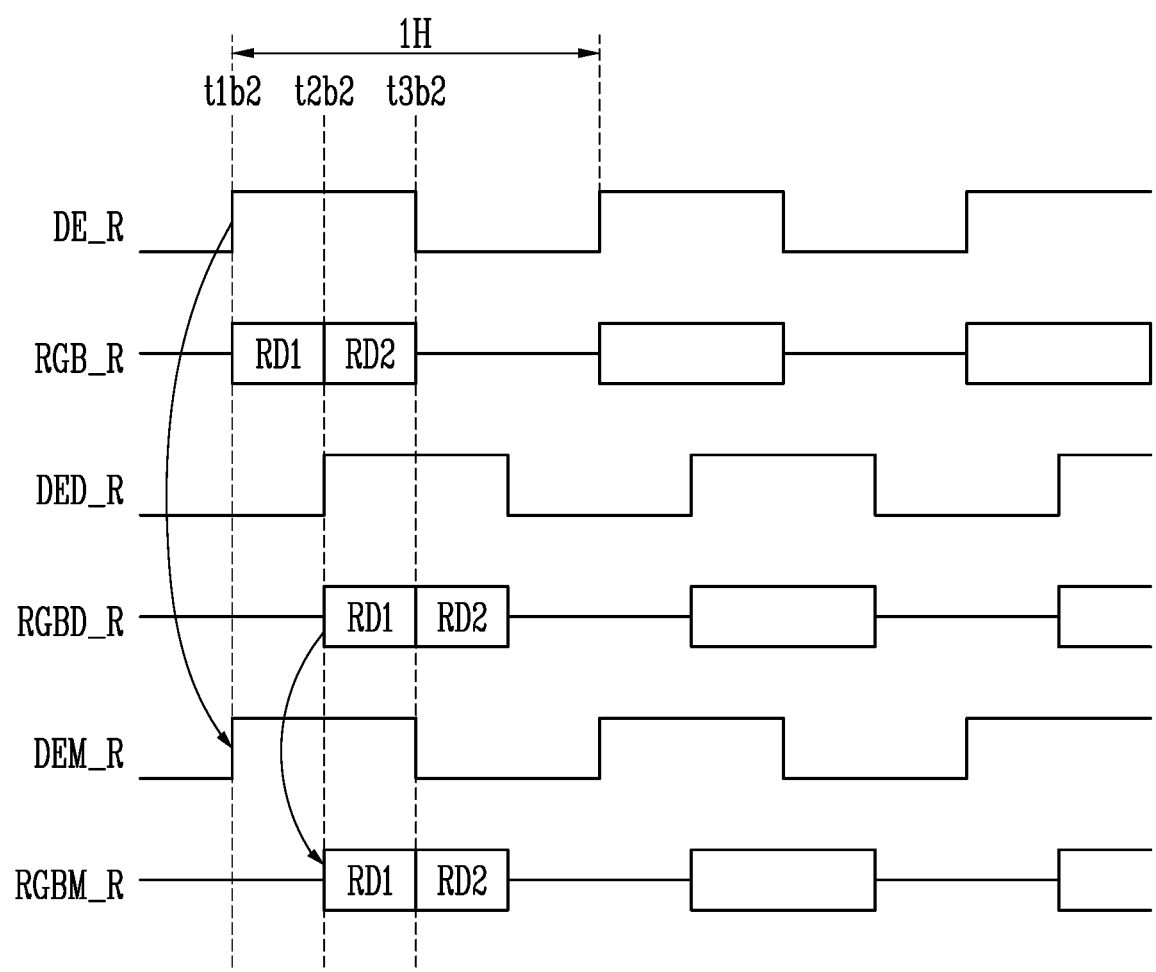

Referring to FIG. 13, the second stereopsis depth adjuster 310b may generate second output image data RGBM_R and a second output data enable signal DEM_R, based on second input image data RGB_R and a second input data enable signal DE_R. In the second input data enable signal DE_R, an enable level (e.g., a high level) and a disable level (e.g., a low level) may be repeated using one horizontal period 1H as a cycle.

The second stereopsis depth adjuster 310b may generate a second delay data enable signal DED_R by delaying the second input data enable signal DE_R. With respect to the second input data enable signal DE_R, the second delay data enable signal DED_R may be delayed by a period t1b2 to t2b2. Meanwhile, the second stereopsis depth adjuster 310b may generate second delay image data RGBD_R by delaying the second input image data RGB_R. With respect to the second input image data RGB_R, the second delay image data RGBD_R may be delayed by the period t1b2 to t2b2.

The second stereopsis depth adjuster 310b may set a phase of the second output data enable signal DEM_R to be substantially equal to a phase of the second input data enable signal DE_R. For example, the second stereopsis depth adjuster 310b may determine, as the second output data enable signal DEM_R, the second input data enable signal DE_R selected from the second input data enable signal DE_R and the second delay data enable signal DED_R.

Moreover, the second stereopsis depth adjuster 310b may set the second output image data RGBM_R to be delayed from the second input image data RGB_R. For example, the second stereopsis depth adjuster 310b may determine, as the second output image data RGBM_R, the second delay image data RGBD_R selected from the second input image data RGB_R and the second delay image data RGBD_R.

As described above, the second sub-display device 10b receives the second output data enable signal DEM_R and the second output image data RGBM_R. The second sub-display device 10b may determine that the second output image data RGBM_R received during a period t1b2 to t3b2 in which the second output data enable signal DEM_R has an enable level (e.g., a high level) is valid. Therefore, the second sub-display device 10b may neglect grayscale data RD2 of the second output image data RGBM_R received after a time t3b2, such as from the time t3b2 through the horizontal period 1H or cycle.

The second output image data RGBM_R may have basic data during the period t1b2 to t2b2. Although the basic data may vary according to a setting, it is assumed that the basic data is a null data, without limitation thereto. The second output image data RGBM_R may have grayscale data RD1 during a period t2b2 to t3b2. That is, the second sub-display device 10b may display a second object, based on the null data and the delayed grayscale data RD1.

Referring to FIG. 15, a null area DMAb2 may be added based on the null data of the period t1b2 to t2b2. The null area DMAb2 may be a partial area in contact with a side surface of the second pixel unit 14b in the opposite direction of the first direction DR1. A second object OBJb2 and a null area EMTb2, which are based on the grayscale data RD1 of the period t2b2 to t3b2, may be located in the first direction DR1 with respect to the second object OBJb and the null area EMTb, which are based on the second input image data RGB_R.

Figure 14:
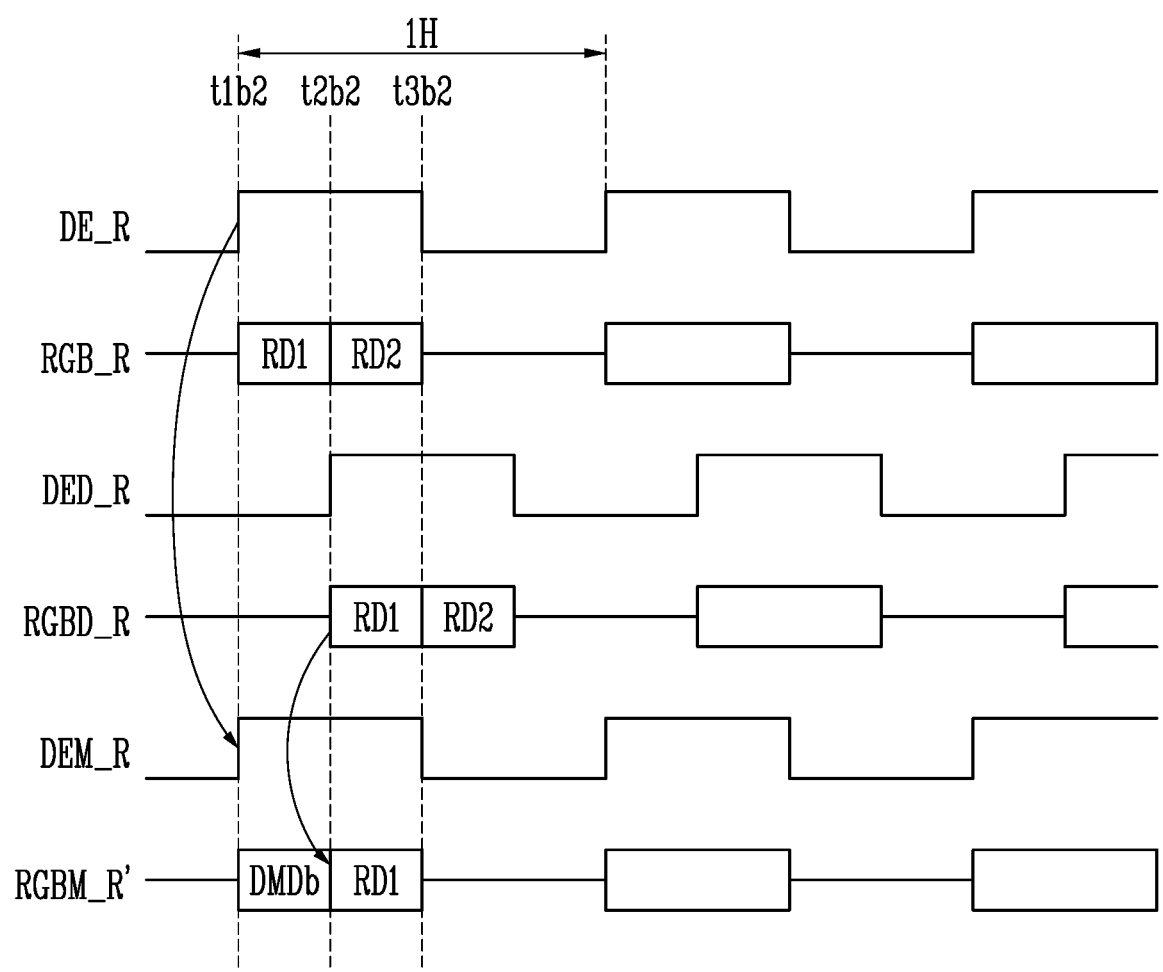

Another example of a second output image data RGBM_R' is described with reference to FIG. 14. The basic data need not be the null data during the period t1b2 to t2b2. The second stereopsis depth adjuster 310b may generate second output image data RGBM_R' by removing a portion RD2 of the second delay image data RGBD_R and adding null data DMDb prior to a portion RD1 of the second delay image data RGBD_R. That is, the second stereopsis depth adjuster 310b may set a portion RD1 of the second output image data RGBM_R' to be substantially equal to the portion RD1 of the second input image data RGB_R, and add the null data DMDb prior to the portion RD1 of the second output image data RGBM_R'. Moreover, the second stereopsis depth adjuster 310b may set the second output image data RGBM_R' not to include the portion RD2 of the second input image data RGB_R.

Referring to FIG. 15, it can be seen that a relative distance between the first object OBJa2 and the second object OBJb2 has become longer than a relative distance between the first object OBJa and the second object OBJb. Thus, the user can view an object having an increased stereopsis depth.

FIG. 16 illustrates an embodiment in which an object is moved while the stereopsis depth of the object is maintained.

A first period t1a2 to t2a2 in which the first stereopsis depth adjuster 310a allows the first output data enable signal DEM_L to be delayed from the first input data enable signal DE_1 and a second period t1b to t2b in which the second stereopsis depth adjuster 310b allows the second output data enable signal DEM_R to be delayed from the second input data enable signal DE_R may be the same. A driving method of the first pixel unit 14a, which is shown in FIG. 16, is substantially the same as the driving method of the second pixel unit 14b, which is shown in FIG. 10, and therefore, overlapping descriptions need not be repeated.

In accordance with this embodiment, it can be seen that a relative distance between the first object OBJa2 and the second object OBJb1 is substantially equal to a relative distance between the first object OBJa and the second object OBJb. Moreover, it can be seen that an object moves in the opposite direction of the first direction DR1. Thus, the user can view that the object moves while maintaining a stereopsis depth.

Figure 17:
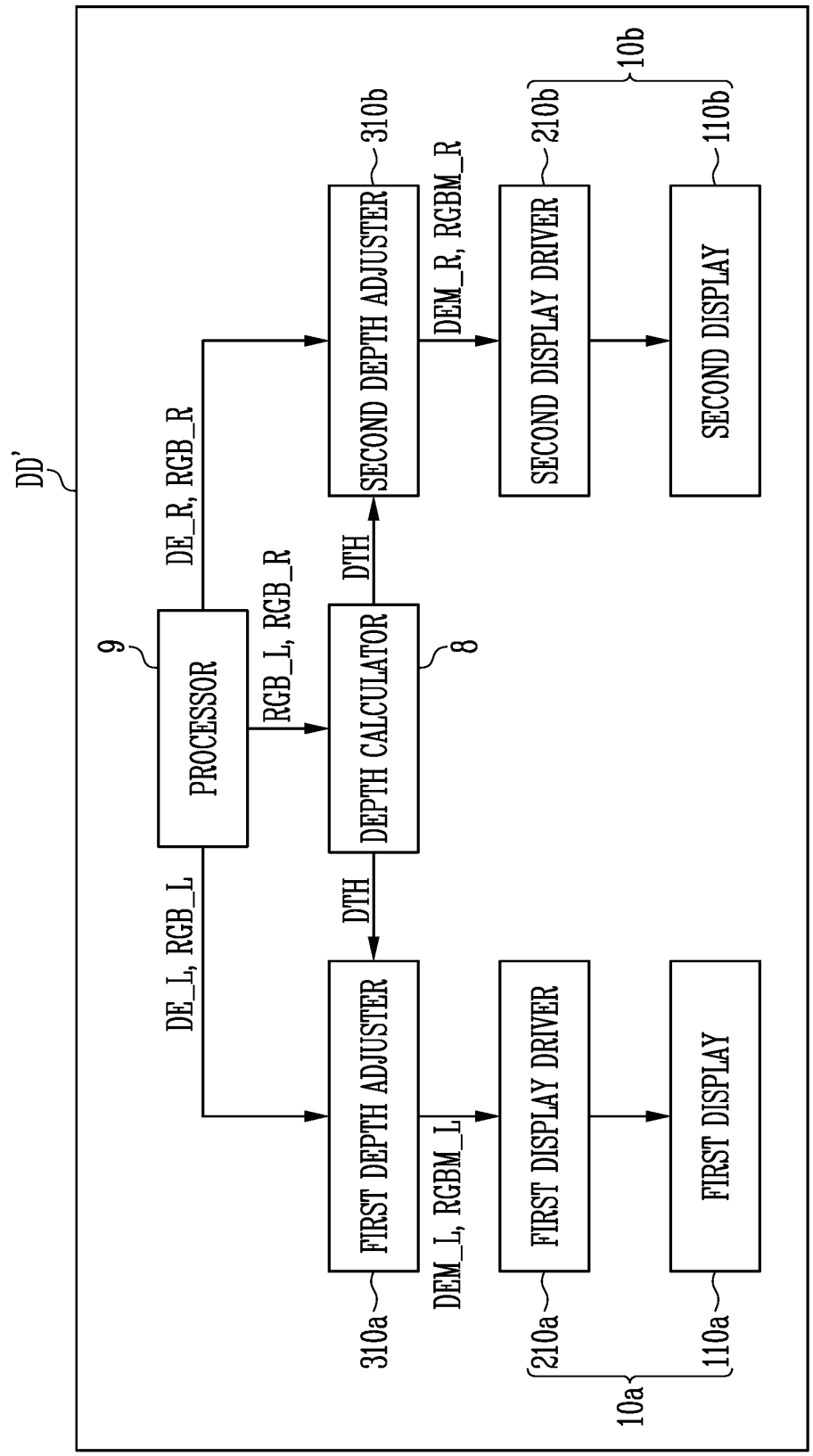
FIG. 17 is a block diagram illustrating a display device in accordance with an embodiment of the present disclosure.

FIG. 17 illustrates a display device in accordance with an embodiment of the present disclosure.

The display device DD' shown in FIG. 17 may further include a stereopsis depth calculator 8 with respect to the display device DD shown in FIG. 1. In FIG. 17, descriptions of components overlapping with the components of the display device DD shown in FIG. 1 may be omitted.

The stereopsis depth calculator 8 may calculate a stereopsis depth DTH of an object, based on the first input image data RGB_L and the second input image data RGB_R. For example, when the stereopsis depth DTH is different from a predetermined reference stereopsis depth, the first stereopsis depth adjuster 310a may set the first output data enable signal DEM_L to be delayed from the first input data enable signal DE_L. In other embodiments, when the stereopsis depth DTH is different from the predetermined reference stereopsis depth, the first stereopsis depth adjuster 310a and the second stereopsis depth adjuster 310b may perform the stereopsis depth decreasing method or the stereopsis depth increasing method, which is described in FIGS. 6 to 15.

The stereopsis depth decreasing method and the stereopsis depth increasing method have already been described. Therefore, hereinafter, a method in which the stereopsis depth calculator 8 calculates the stereopsis depth DTH of the object is described.

The stereopsis depth calculator 8 may convert the first color grayscale, the second color grayscale, and the third color grayscale, which are included in the first input image data RGB_L, into a YCoCg color model according to the following Equations 1, 2, and 3.

$$Y = R/4 + G/2 + B/4 \quad \text{[Equation 1]}$$

$$Co = R/2 + 0G - B/2 \quad \text{[Equation 2]}$$

$$Cg = -R/4 + G/2 - B/4 \quad \text{[Equation 3]}$$

Here, Y may be a luminance, Co may be an orange chrominance, Cg may be a green chrominance, R may be the first color grayscale (e.g., a red grayscale), G may be the second color grayscale (e.g., a green grayscale), and B may be a third color grayscale (e.g., a blue grayscale).

The stereopsis depth calculator 8 may calculate average luminances by using, as a unit, an even-numbered horizontal line (e.g., an even-numbered pixel row) of the first pixel unit 14a. For example, when the number of horizontal lines of the first pixel unit 14a is 3840, the stereopsis depth calculator 8 may calculate 1920 average luminances with respect to the first pixel unit 14a.

In another example, the stereopsis depth calculator 8 may calculate average luminances by using, as a unit, an odd-numbered horizontal line (e.g., an odd-numbered pixel row) of the first pixel unit 14a. In another example, the stereopsis depth calculator 8 may calculate average luminances by using, as a unit, a horizontal line (e.g., a pixel row) with respect to substantially all horizontal lines. However, hereinafter, for convenience of description, it is assumed that the stereopsis depth calculator 8 calculates average luminances by using, as a unit, an even-numbered horizontal line (e.g., an even-numbered pixel row), without limitation thereto.

Similarly, the stereopsis depth calculator 8 may convert the first color grayscale, the second color grayscale, and the third color grayscale, which are included in the second input image data RGB_R, into YCoCg color model according to Equations 1, 2, and 3. Moreover, the stereopsis depth calculator 8 may calculate average luminances by using, as a unit, an even-numbered horizontal line (e.g., an even-numbered pixel row) of the second pixel unit 14b. For example, when the number of horizontal lines of the second pixel unit 14b is 3840, the stereopsis depth calculator 8 may calculate 1920 average luminances with respect to the second pixel unit 14b.

The stereopsis depth calculator 8 may calculate difference values of average luminances with respect to horizontal lines corresponding to the first pixel unit 14a and the second pixel unit 14b. For example, the stereopsis depth calculator 8 may calculate a difference value of an average luminance with respect to a second horizontal line of the first pixel unit 14a and an average luminance with respect to a second horizontal line of the second pixel unit 14b. Moreover, the stereopsis depth calculator 8 may calculate a difference value of an average luminance with respect to a fourth horizontal line of the first pixel unit 14a and an average luminance with respect to a fourth horizontal line of the second pixel unit 14b.

The stereopsis depth calculator 8 may determine an average of the difference values as the stereopsis depth DTH of the object. As the relative distance of the first object and the second object becomes closer, the stereopsis depth DTH may be calculated smaller. As the relative distance of the first object and the second object becomes more distant, the stereopsis depth DTH may be calculated larger.

In an embodiment, the sizes of the first object and the second object are increased when the distance between the first object and the second object is increased, or the sizes of the first object and the second object are decreased when the distance between the first object and the second object is decreased.

In the display device and the driving method thereof in accordance with the present disclosure, a stereopsis depth of an image object can be adjusted according to a user's interpupillary distance, depth perception, or interactive choice.

Illustrative embodiments have been disclosed herein, and although specific terms are employed, such embodiments and terms are used and are to be interpreted in a generic and descriptive sense and not for purposes of limitation. In some instances, as would be apparent to one of ordinary skill in the pertinent art as of the filing of the present application, various features, characteristics, and/or elements described in connection with a particular embodiment may be used singly or in combination with other features, characteristics, and/or elements described in connection with other embodiments, unless otherwise specifically indicated. Accordingly, it shall be understood that various changes in form and details may be made without departing from the scope or spirit of the present disclosure as set forth in the following claims.

What is claimed is:

1. A display device comprising:
   a processor configured to generate first input image data, a first input data enable signal, second input image data, and a second input data enable signal;
   a first stereopsis depth adjuster configured to generate first output image data and a first output data enable signal, based on the first input image data and the first input data enable signal;
   a first sub-display device configured to display a first object, based on the first output image data and the first output data enable signal;
   a second stereopsis depth adjuster configured to generate second output image data and a second output data enable signal, based on the second input image data and the second input data enable signal; and
   a second sub-display device configured to display a second object, based on the second output image data and the second output data enable signal,
   wherein the first stereopsis depth adjuster sets the first output data enable signal to be delayed from the first input data enable signal, or the second stereopsis depth adjuster sets the second output data enable signal to be delayed from the second input data enable signal, so that positions of the first object and the second object are adjusted.

2. The display device of claim 1,
   wherein the second stereopsis depth adjuster sets the second output data enable signal to be delayed from the second input data enable signal, and
   wherein the second stereopsis depth adjuster sets the second output image data to be substantially equal to the second input image data.

3. The display device of claim 1,
   wherein the second stereopsis depth adjuster sets the second output data enable signal to be delayed from the second input data enable signal, and
   wherein the second stereopsis depth adjuster sets a portion of the second output image data to be substantially equal to a portion of the second input image data, and adds null data subsequent to the portion of the second output image data.

4. The display device of claim 1, wherein the first stereopsis depth adjuster sets a phase of the first output data enable signal to be substantially equal to a phase of the first input data enable signal.

5. The display device of claim 4, wherein the first stereopsis depth adjuster sets the first output image data to be delayed from the first input image data.

6. The display device of claim 4, wherein the first stereopsis depth adjuster sets a portion of the first output image data to be substantially equal to a portion of the first input image data, and adds null data prior to the portion of the first output image data.

7. The display device of claim 1, wherein the first stereopsis depth adjuster sets the first output data enable signal to be delayed from the first input data enable signal, and
   wherein the first stereopsis depth adjuster sets the first output image data to be substantially equal to the first input image data.

8. The display device of claim 1, wherein the first stereopsis depth adjuster sets the first output data enable signal to be delayed from the first input data enable signal, and
   wherein the first stereopsis depth adjuster sets a portion of the first output image data to be substantially equal to a portion of the first input image data, and adds null data subsequent to the portion of the first output image data.

9. The display device of claim 1, wherein the second stereopsis depth adjuster sets a phase of the second output data enable signal to be substantially equal to a phase of the second input data enable signal.

10. The display device of claim 9, wherein the second stereopsis depth adjuster sets the second output image data to be delayed from the second input image data.

11. The display device of claim 9, wherein the second stereopsis depth adjuster sets a portion of the second output image data to be substantially equal to a portion of the second input image data, and adds null data prior to the portion of the second output image data.

12. The display device of claim 1, further comprising a stereopsis depth calculator configured to calculate a stereopsis depth of an object, based on the first input image data and the second input image data.

13. The display device of claim 12, wherein, when the stereopsis depth is different from a predetermined reference stereopsis depth, the first stereopsis depth adjuster sets the first output data enable signal to be delayed from the first input data enable signal.

14. The display device of claim 1, wherein a first time for which the first stereopsis depth adjuster sets the first output data enable signal to be delayed from the first input data enable signal and a second time for which the second stereopsis depth adjuster sets the second output data enable signal to be delayed from the second input data enable signal are substantially equal to each other.

15. A method of driving a display device, the method comprising:
- generating first input image data, a first input data enable signal, second input image data, and a second input data enable signal;
- generating first output image data and a first output data enable signal, based on the first input image data and the first input data enable signal;
- displaying a first object, based on the first output image data and the first output data enable signal;
- generating second output image data and a second output data enable signal, based on the second input image data and the second input data enable signal; and
- displaying a second object, based on the second output image data and the second output data enable signal,
- wherein the first output data enable signal is set to be delayed from the first input data enable signal, or the second output data enable signal is set to be delayed from the second input data enable signal, so that positions of the first object and the second object are adjusted.

16. The method of claim 15,
wherein the second output data enable signal is set to be delayed from the second input data enable signal, and
wherein the second output image data is set to be substantially equal to the second input image data.

17. The method of claim 15, wherein the second output data enable signal is set to be delayed from the second input data enable signal, and
wherein a portion of the second output image data is set to be substantially equal to a portion of the second input image data, and null data is added subsequent to the portion of the second output image data.

18. The method of claim 15, wherein a phase of the first output data enable signal is set to be substantially equal to a phase of the first input data enable signal.

19. The method of claim 18, wherein the first output image data is set to be delayed from the first input image data.

20. The method of claim 18, wherein a portion of the first output image data is set to be substantially equal to a portion of the first input image data, and null data is added prior to the portion of the first output image data.

* * * * *